United States Patent
Fujishima et al.

(10) Patent No.: US 6,882,459 B2
(45) Date of Patent: Apr. 19, 2005

(54) PHOTOREACTIVE DEVICES, TRANSLUCENT MEMBERS, ORNAMENTS, ANTICORROSIVE DEVICES, DEVICES FOR REDUCING OXYGEN AND DEVICES FOR CONTROLLING GROWTH OF MICROORGANISMS

(75) Inventors: Akira Fujishima, 710-5 Nakamaruko, Nakahara-ku, Kawasaki, Kanagawa 211-0012 (JP); Tetsu Tatsuma, Tokyo (JP); Yoshihisa Ohko, Tokyo (JP); Shuichi Saitoh, Tochigi (JP); Katsuhisa Kashiwazaki, Tochigi (JP)

(73) Assignees: Akira Fujishima, Kanagawa (JP); Koyo Engineering, Tochigi (JP)

( * ) Notice: Subject to any disclaimer, the term of this patent is extended or adjusted under 35 U.S.C. 154(b) by 242 days.

(21) Appl. No.: 09/939,792

(22) Filed: Aug. 28, 2001

(65) Prior Publication Data

US 2002/0047134 A1  Apr. 25, 2002

(30) Foreign Application Priority Data

Sep. 1, 2000  (JP) ................................. P2000-264953
Mar. 22, 2001 (JP) ................................. P2001-083306
Mar. 23, 2001 (JP) ................................. P2001-084139

(51) Int. Cl.$^7$ ............................................... G02F 1/15
(52) U.S. Cl. ..................... 359/265; 359/248; 429/307; 429/304; 429/324
(58) Field of Search ................. 359/265, 273, 359/266, 248, 252, 254, 255, 270, 274; 136/263, 249; 257/40, 218.1; 429/307, 304, 324

(56) References Cited

U.S. PATENT DOCUMENTS 5,874,701 A * 2/1999 Watanabe et al. ...... 204/157.15
5,876,581 A * 3/1999 Itaya et al. ............... 205/316
6,310,282 B1 * 10/2001 Sakurai et al. ........... 136/263
6,376,765 B1 * 4/2002 Wariishi et al. .......... 136/263

FOREIGN PATENT DOCUMENTS

| JP | 53-048985 | 2/1978 |
|----|-----------|--------|
| JP | 61-278720 | 9/1986 |
| JP | 06263734 A | 9/1994 |
| JP | 09267037 | 10/1997 |
| JP | 09276707 | 10/1997 |
| JP | 9-302479 | 11/1997 |
| JP | 10114544 | 5/1998 |
| JP | 10114563 | 5/1998 |
| JP | 10225639 | 5/1998 |
| JP | 10147771 | 6/1998 |
| JP | 10-158860 | 6/1998 |
| JP | 10237357 | 9/1998 |

* cited by examiner

*Primary Examiner*—Ricky Mack
*Assistant Examiner*—Brandi N Thomas
(74) *Attorney, Agent, or Firm*—Lowe Hauptman Gilman & Berner, LLP

(57) ABSTRACT

The inventive photoreactive device has a semiconductor and an oxidation-reduction material. The semiconductor has a conduction band with a potential and being capable of producing electrons under the irradiation of light on the semiconductor. The oxidation-reduction material has a redox potential being positive compared with the potential of the conduction band. The semiconductor supplies electrons into the oxidation-reduction material to reduce it under the irradiation of light for storing the electrons. The stored electrons are discharged from the oxidation-reduction material into a metal material to prevent the corrosion of the metal material.

15 Claims, 31 Drawing Sheets

[Fig.1]
(a)
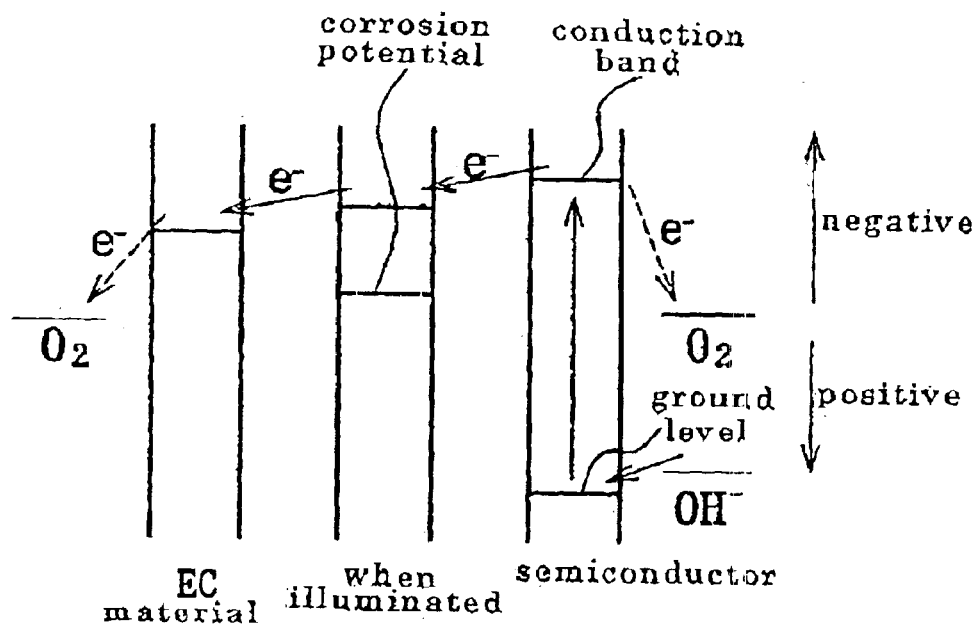
(b)
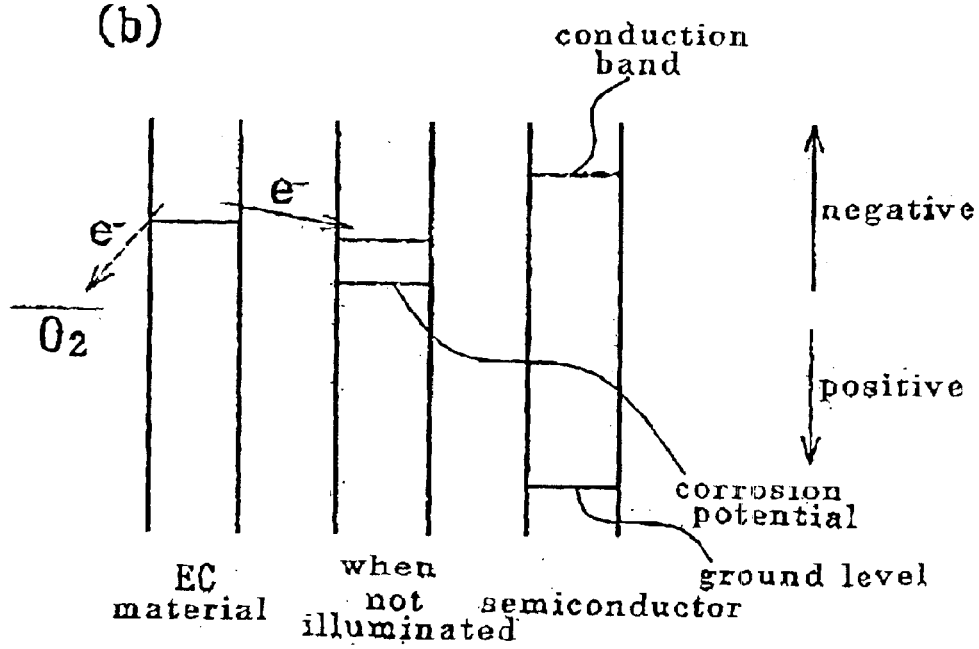

[Fig.2]
(a)
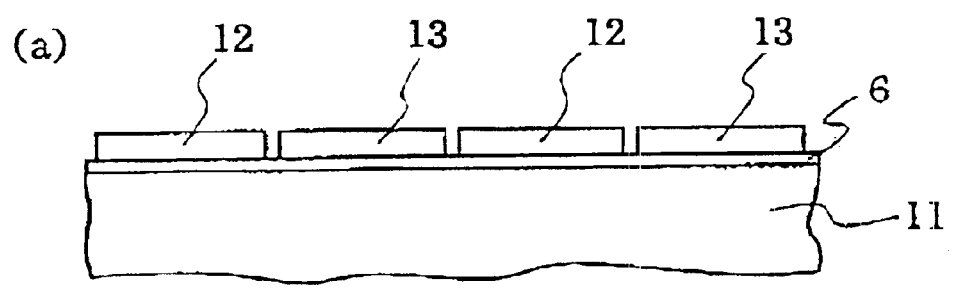
(b)
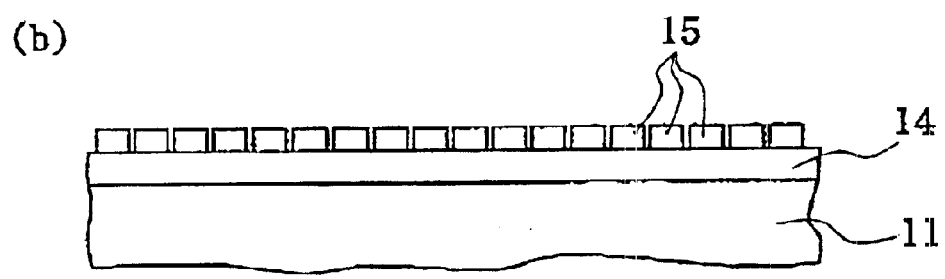
(c)
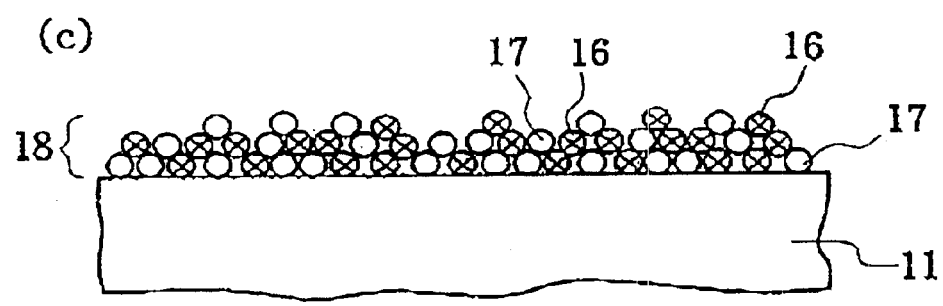

[Fig.3]
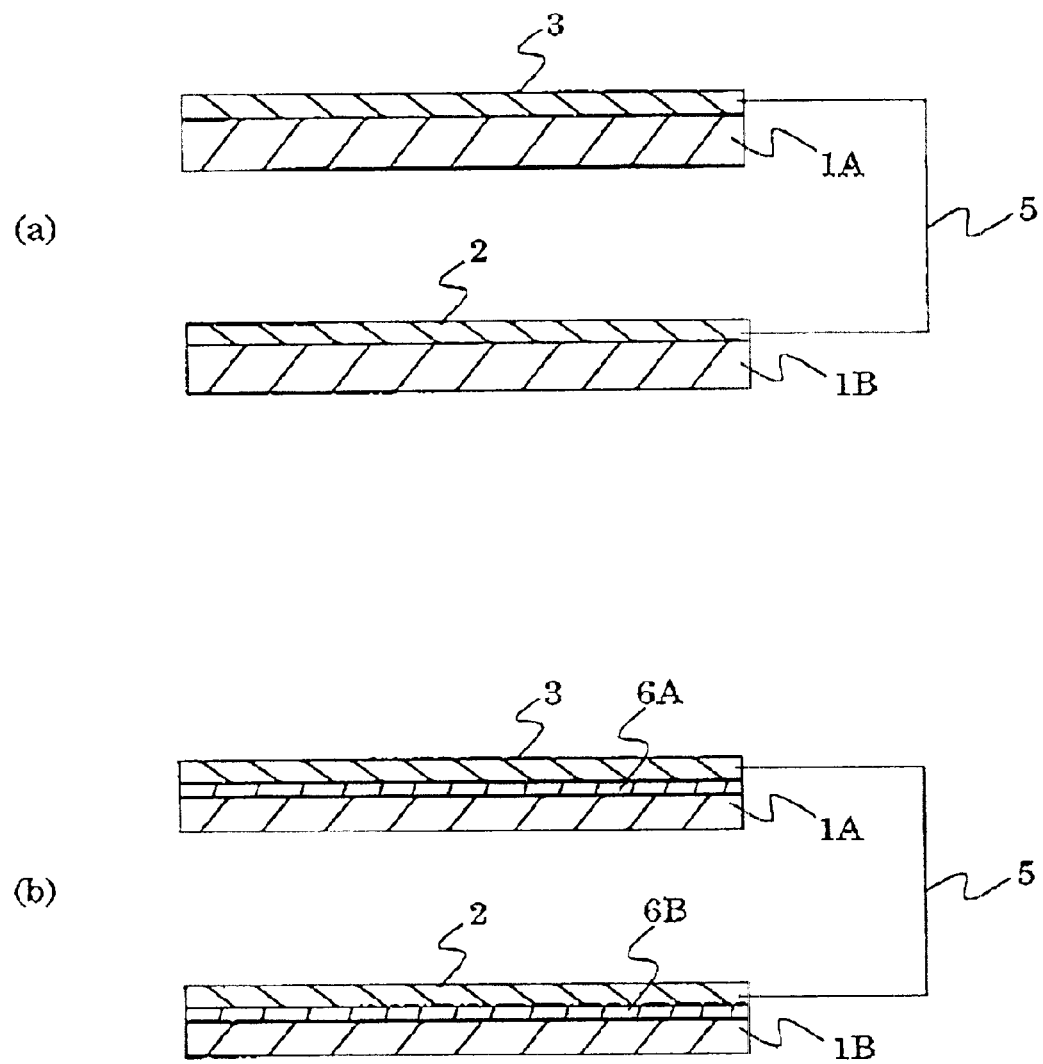

[Fig.4]
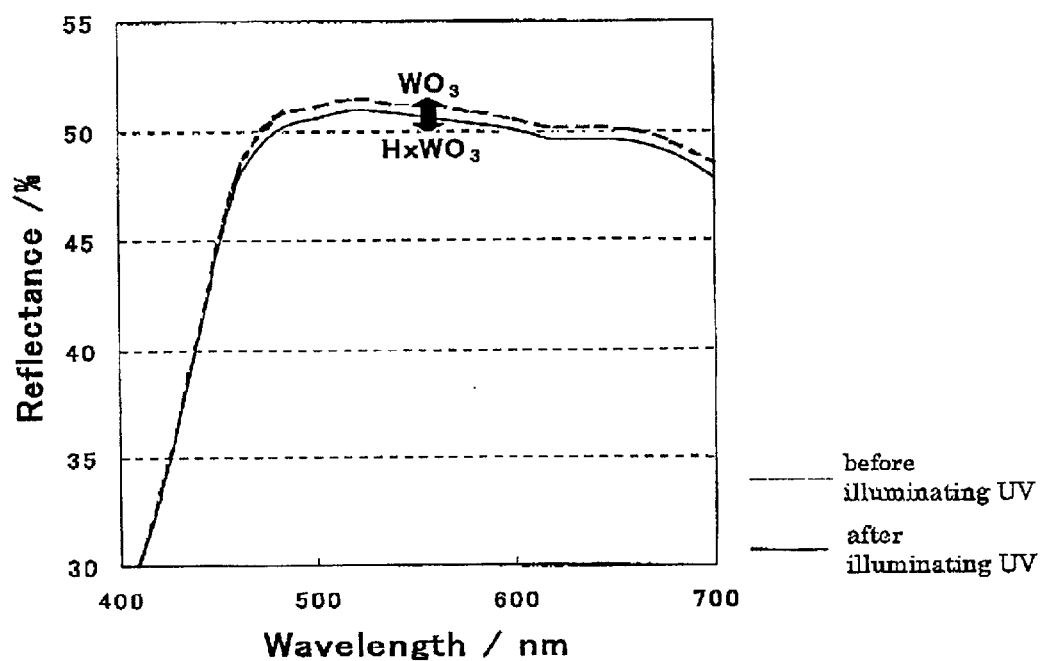
Reflectance change of WO3 before and after illuminating ultraviolet light in distilled water

[Fig.5]
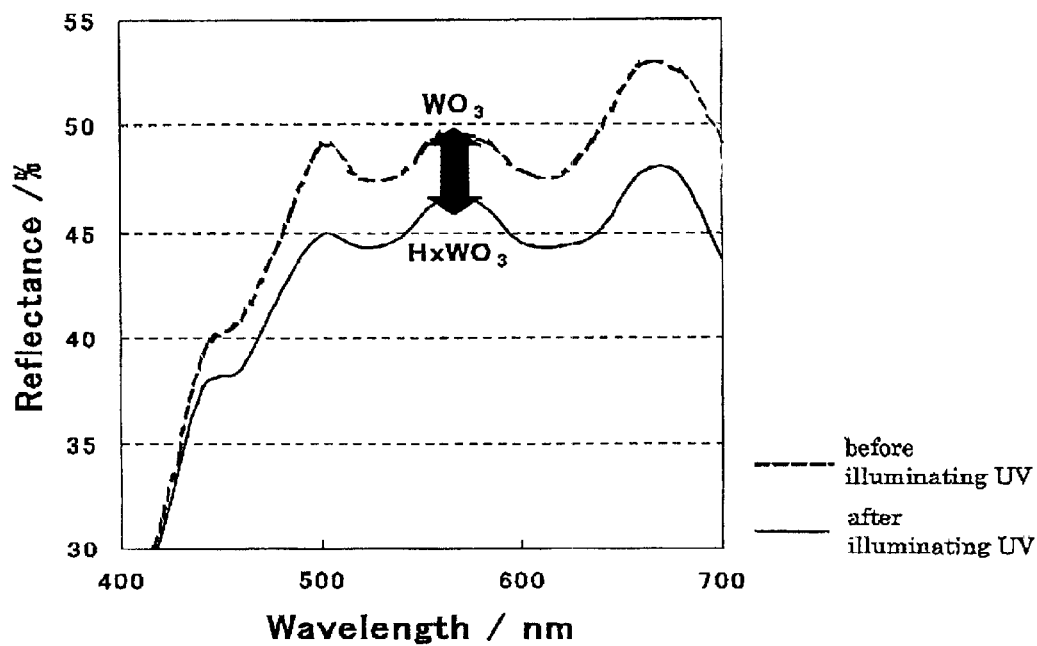
Reflectance change of TiO2-WO3 before and after illuminating ultraviolet light in distilled water (separate type)

[Fig.6]
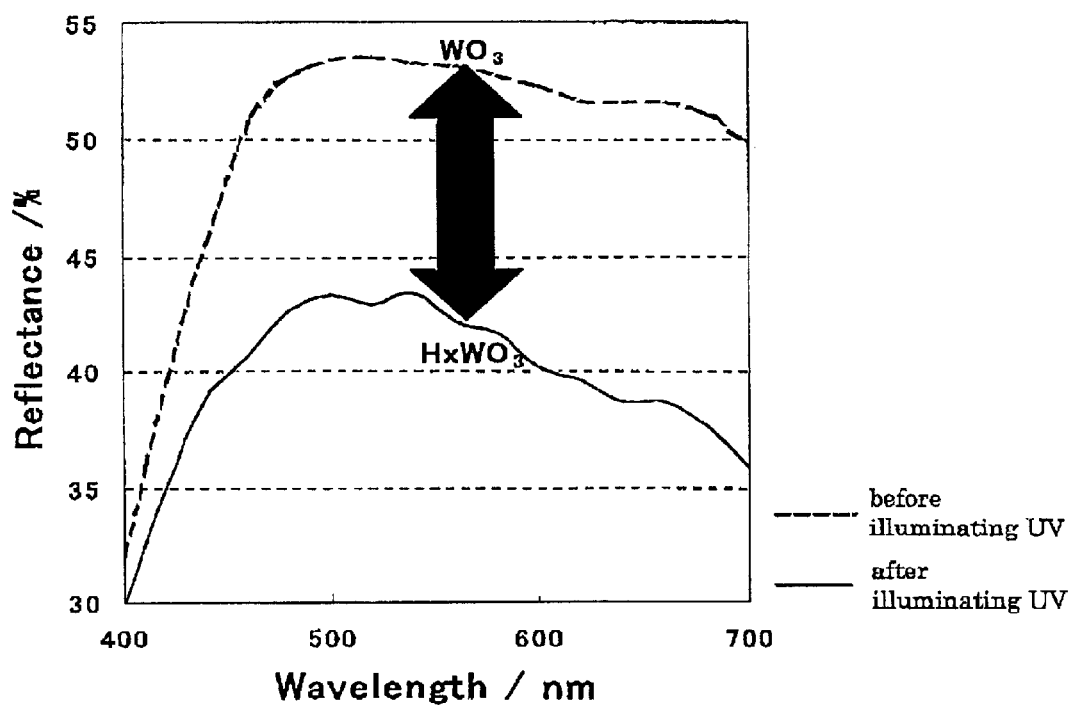
Reflectance change of TiO2-WO3 before and after illuminating ultraviolet light in distilled water (mix type)

[Fig.7]
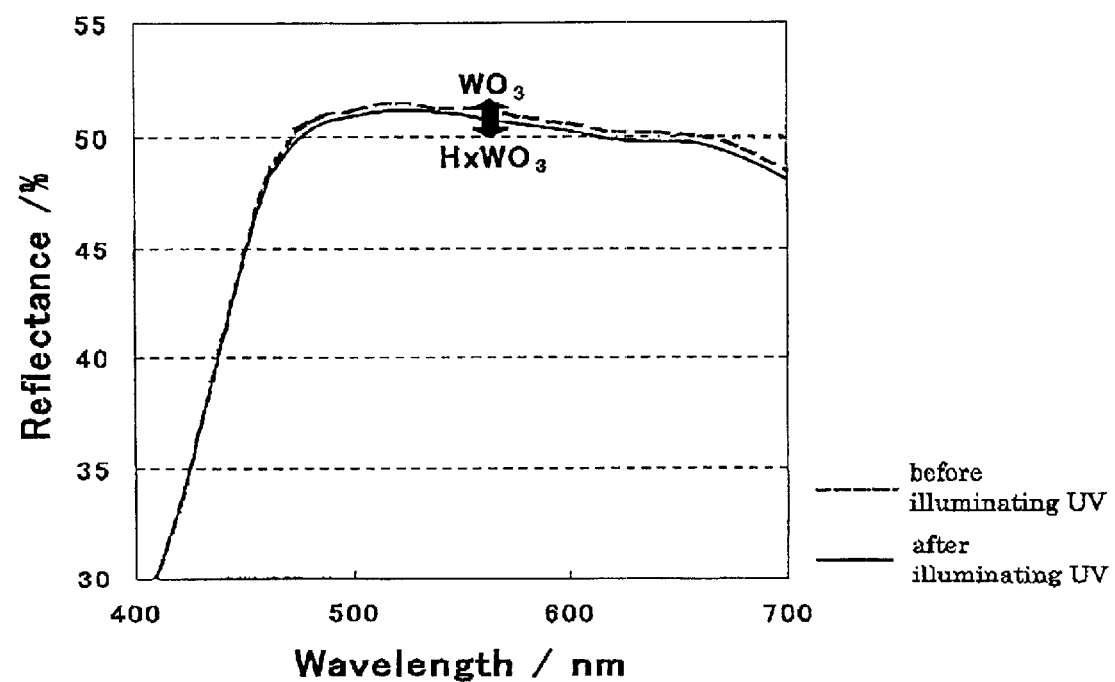
Reflectance change of WO3 before and after illuminating
ultraviolet light in gaseous phase

[Fig.8]
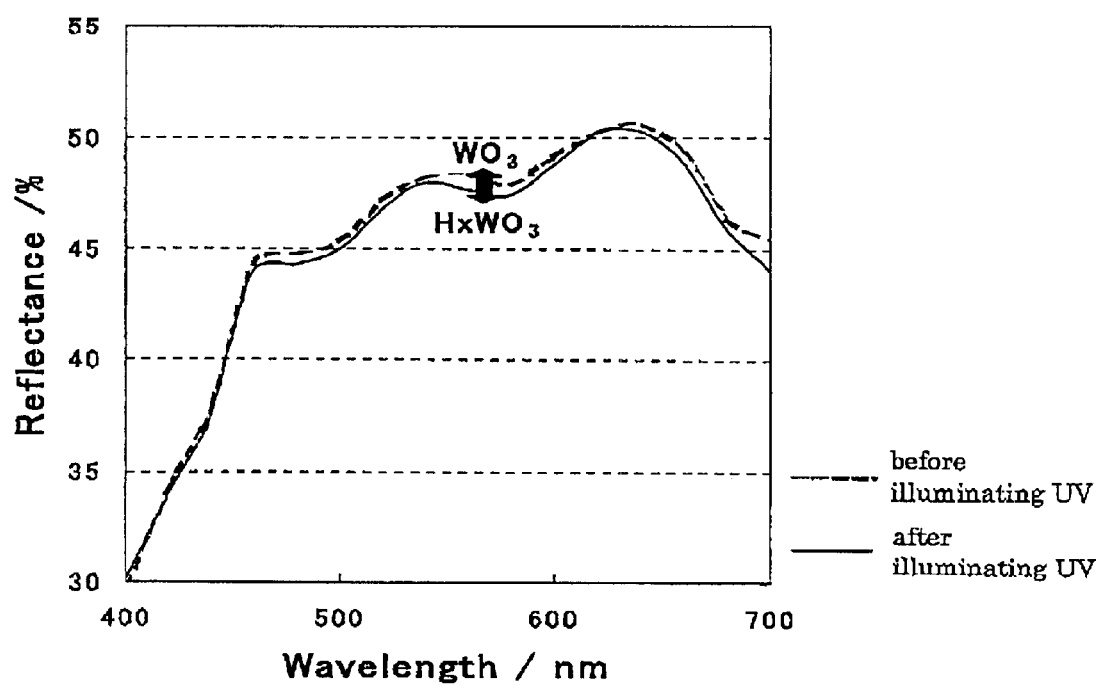
Reflectance change of TiO2-WO3 before and after illuminating ultraviolet light in gaseous phase (separate type)

[Fig.9]
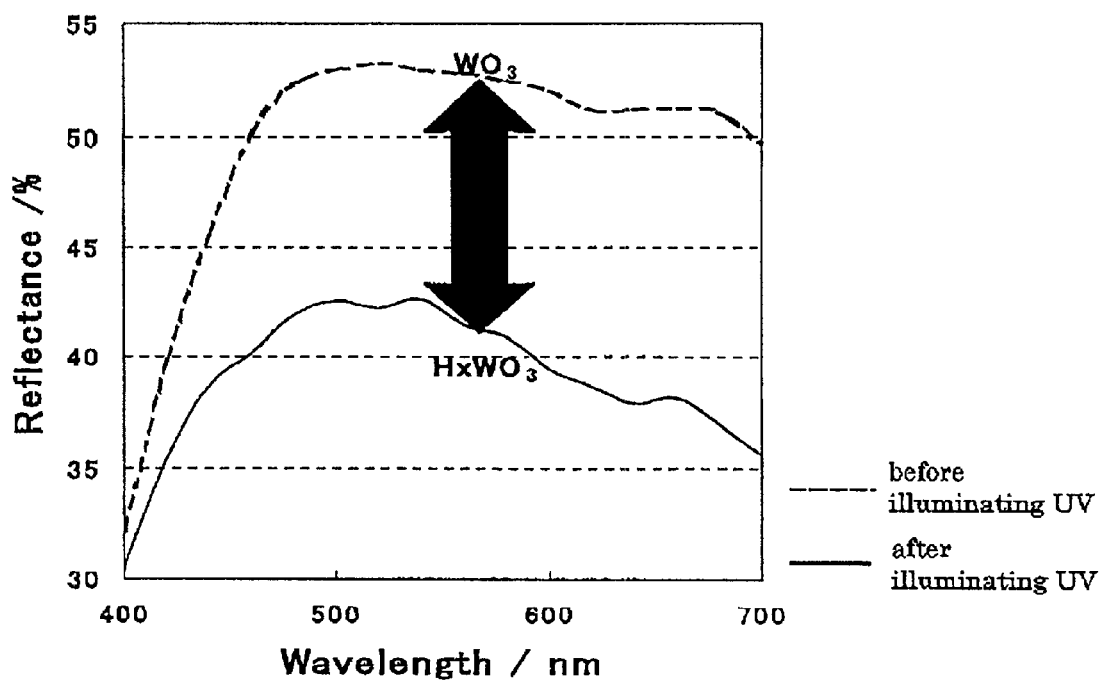
Reflectance change of TiO2-WO3 before and after illuminating
ultraviolet light in gaseous phase (mix type)

[Fig.10]
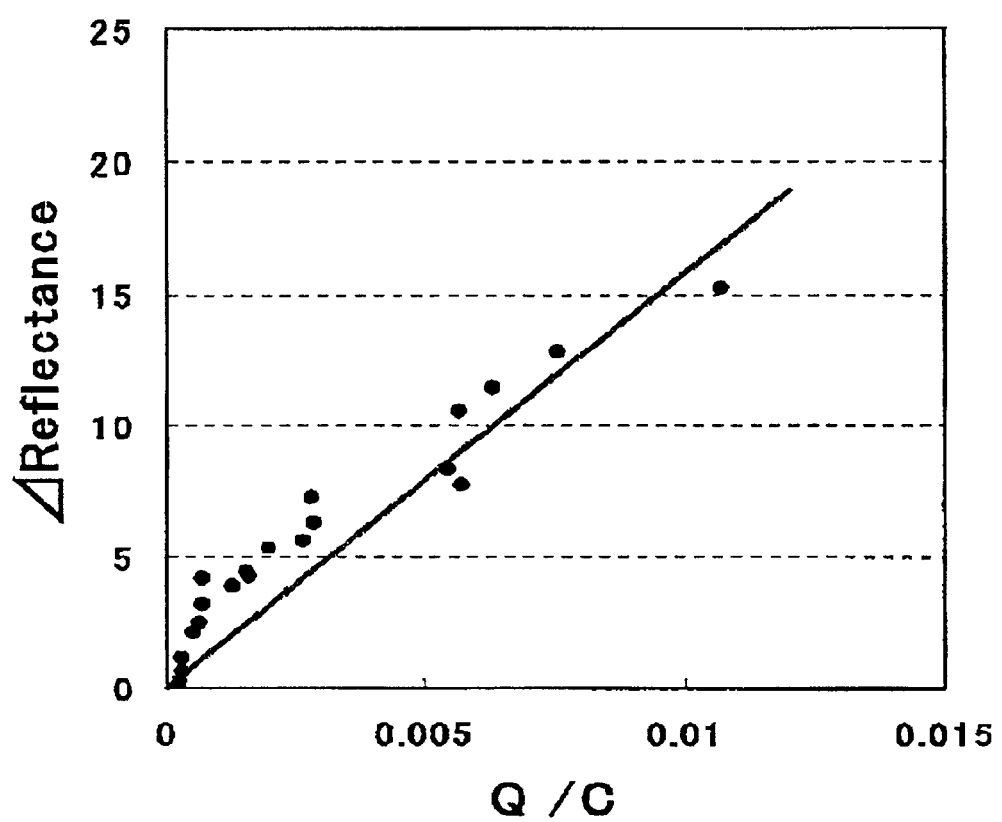
Relationship of charge and color change in WO3

[Fig.11]
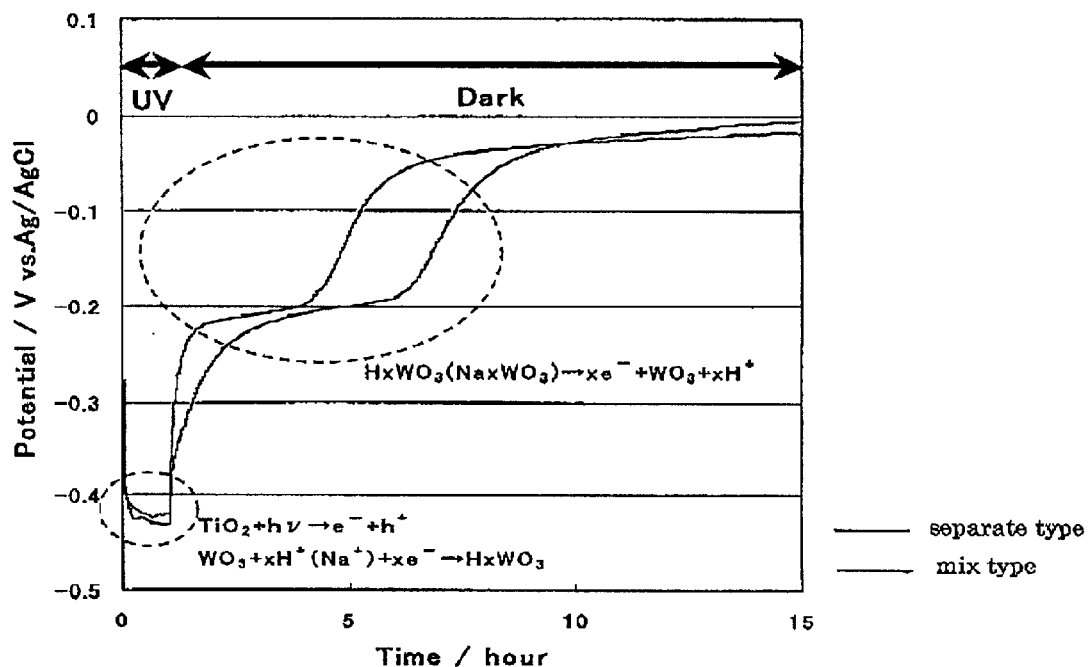
Potential change of TiO2-WO3 before and after illuminating
ultraviolet light in NaCl aqueous solution

[Fig.12]
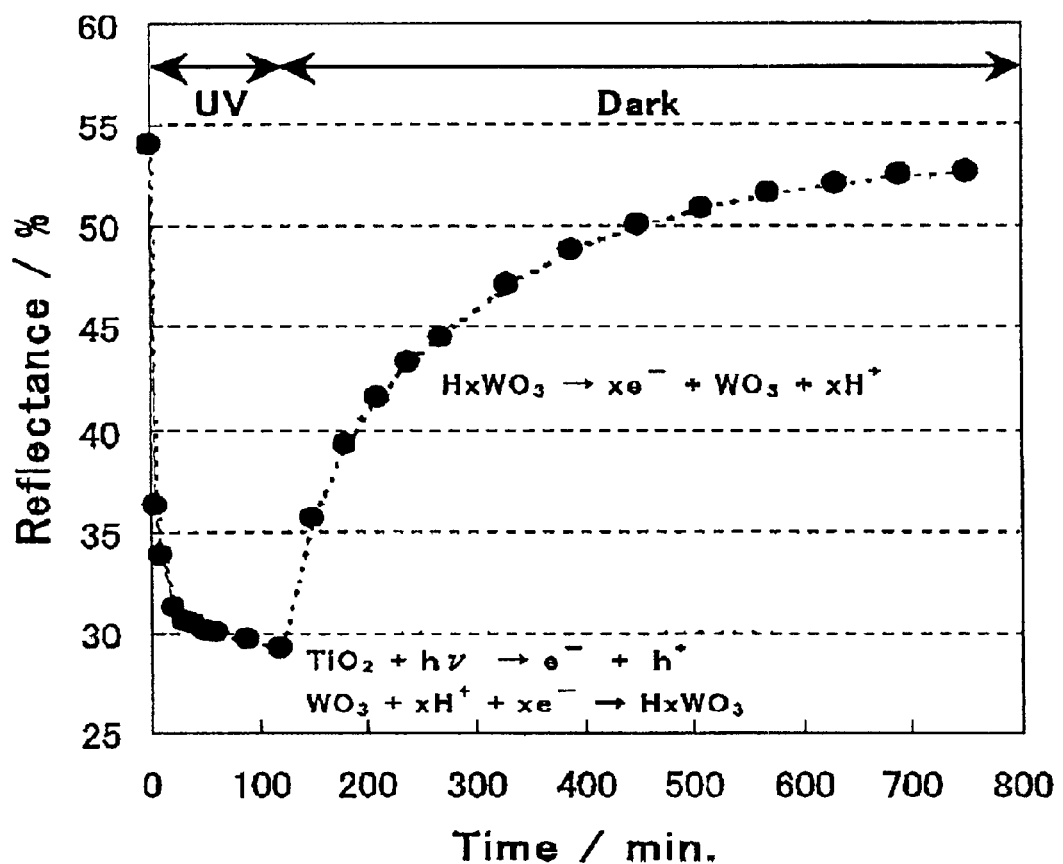
Reflectance change over time of TiO2-WO3 before and after illuminating ultraviolet light in gaseous phase

[Fig.13]
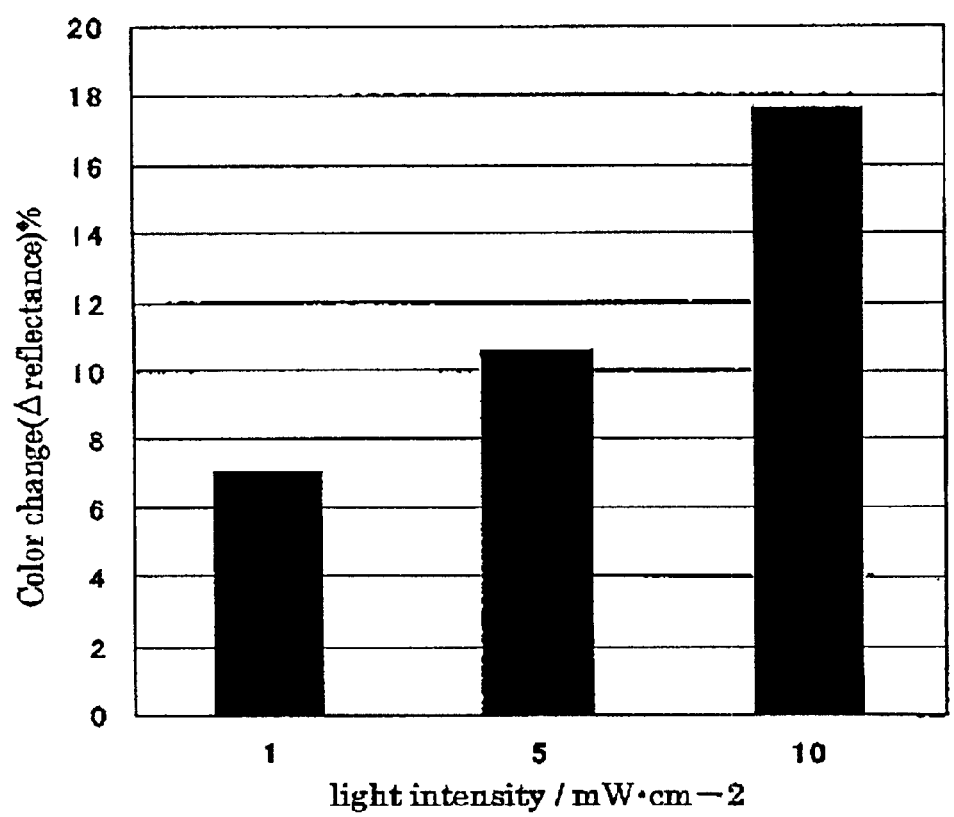
Relationship between light intensity of illuminated ultraviolet light and reflectance of TiO2-WO3

[Fig.14]
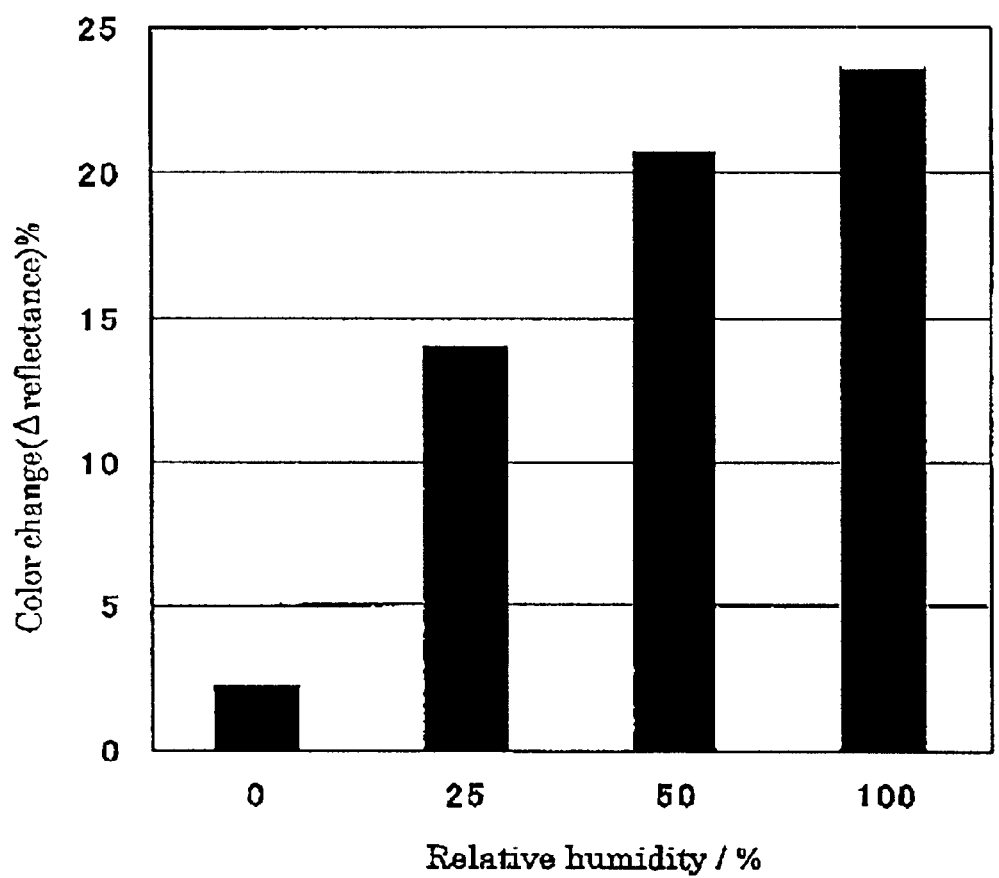
Relationship between humidity and reflectance of TiO2-WO3

[Fig.15]
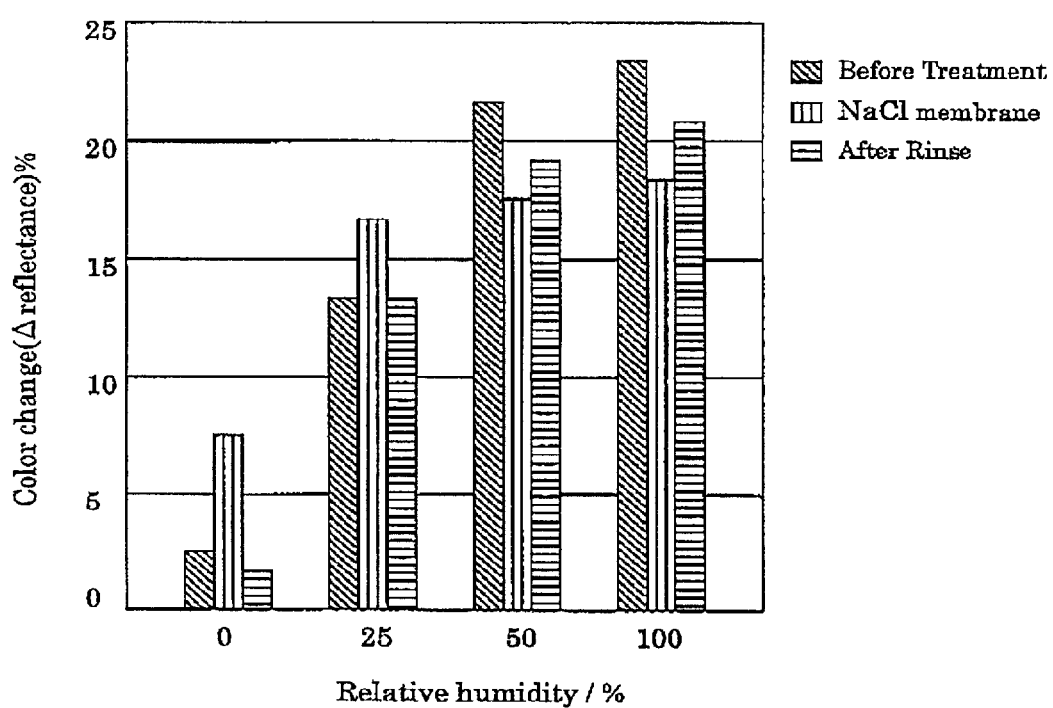

[Fig.16]
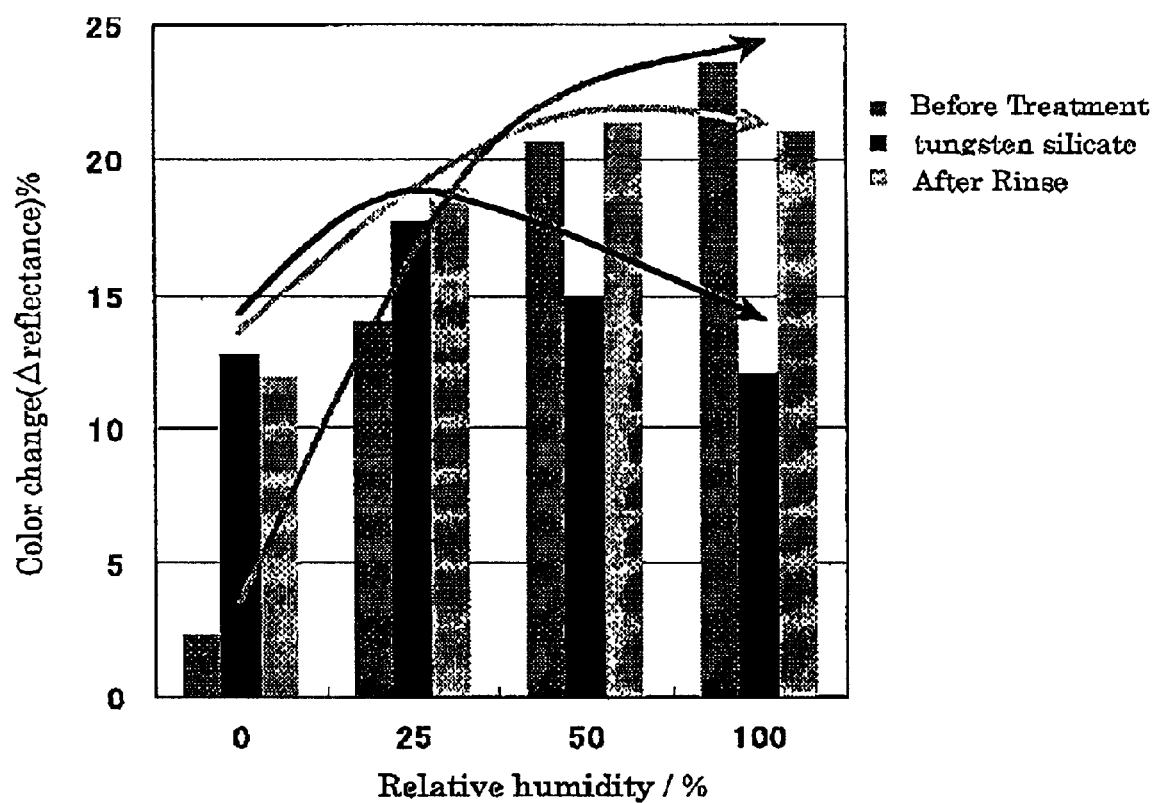
Color changes before treatment, after surface treatment with a heteropolyacid (tungsten silicate), and after rinse

[Fig.17]
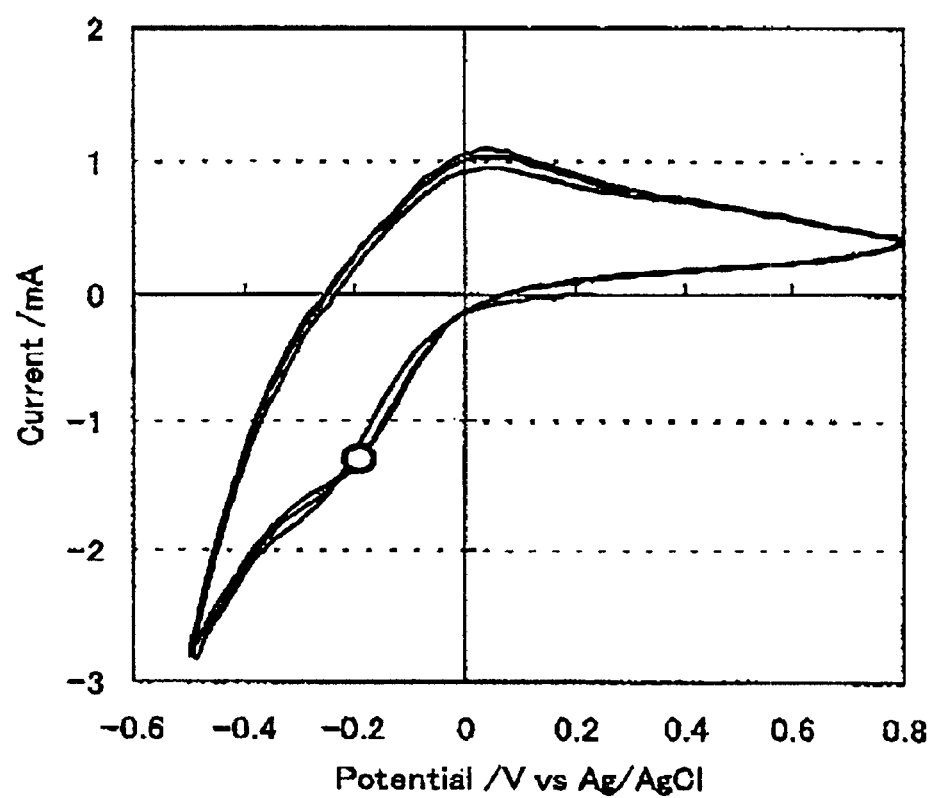

[Fig.18]
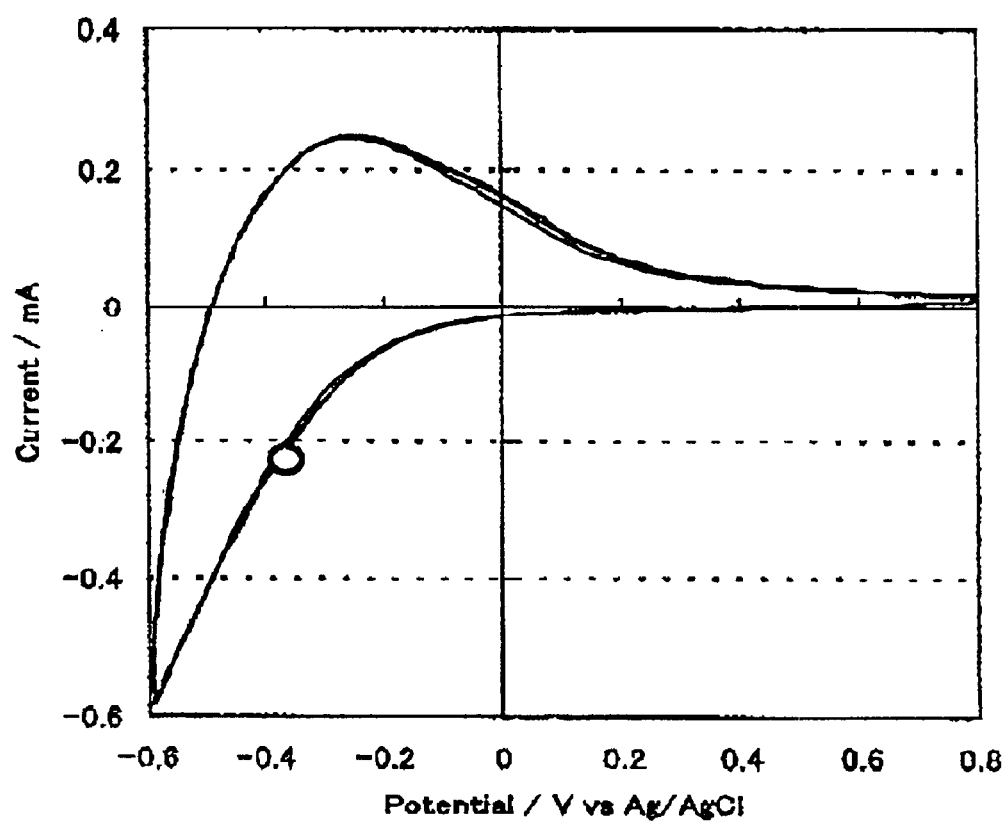

[Fig.19]
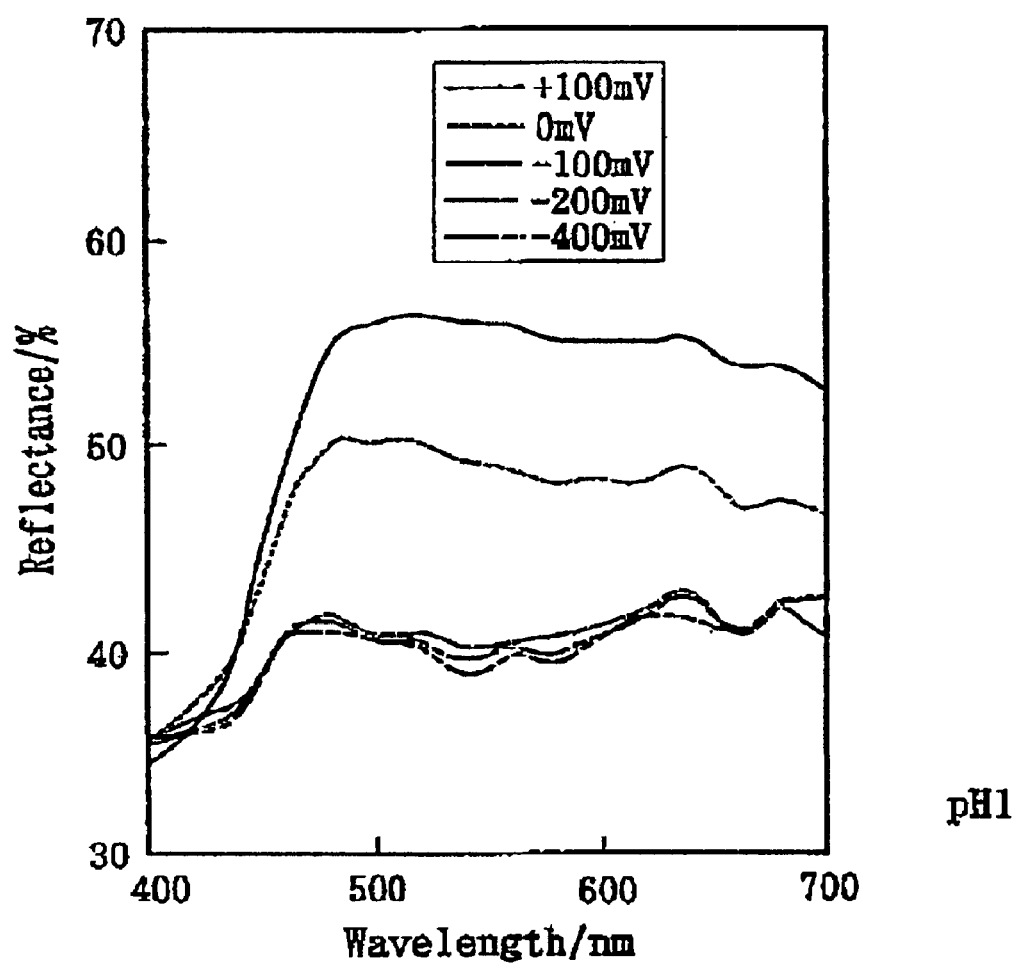

[Fig.20]
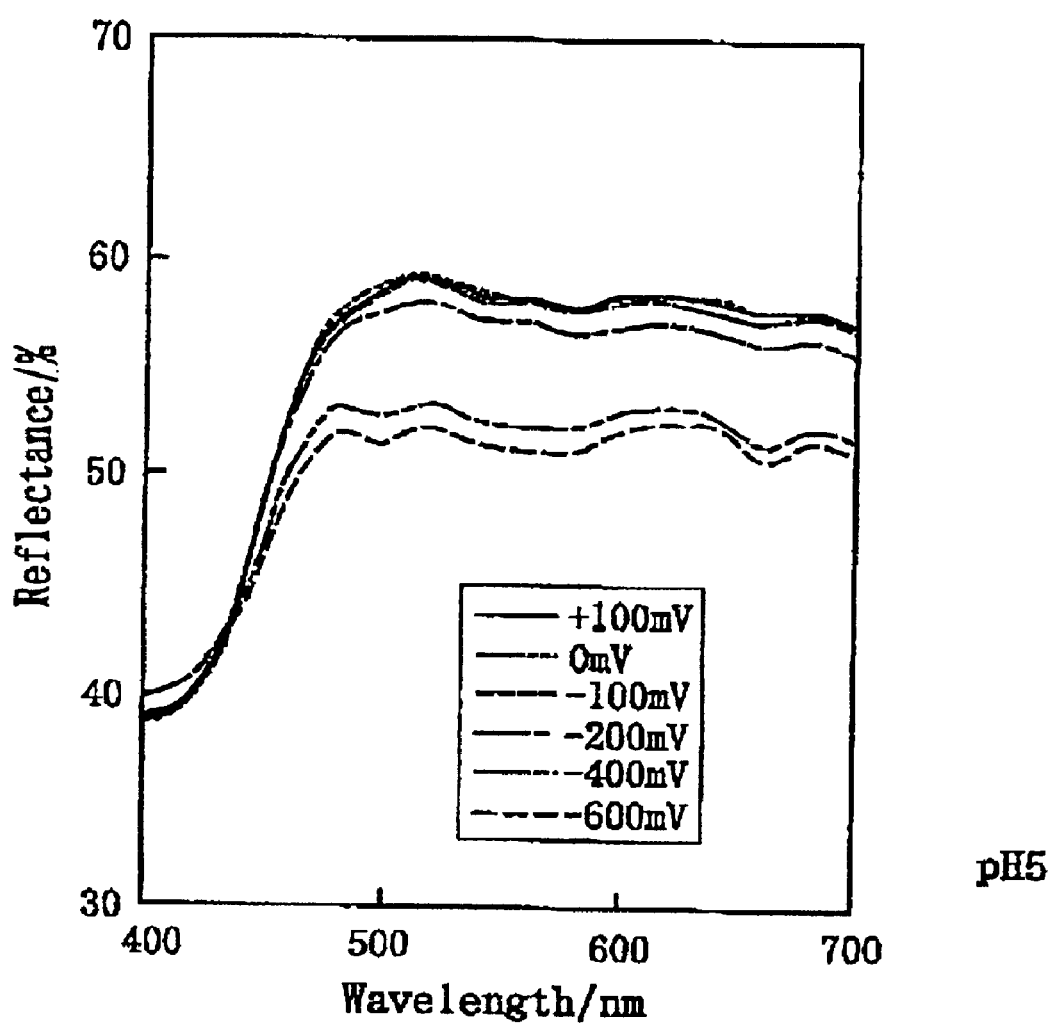

[Fig.21]
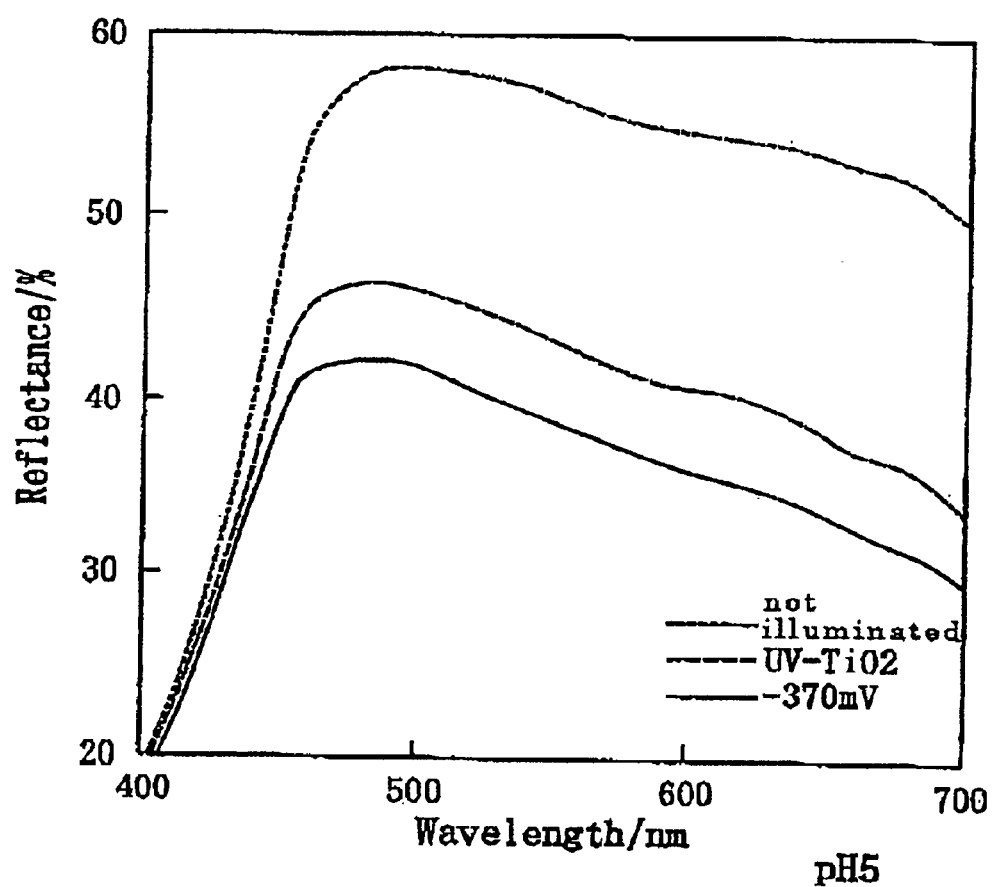

[Fig.22]
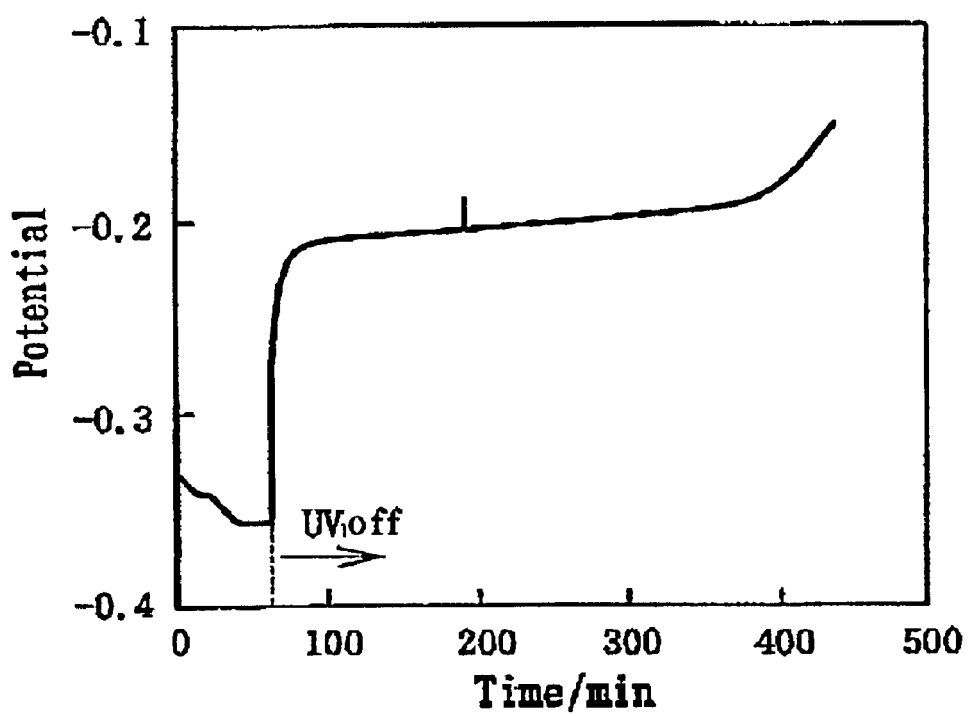

[Fig.23]
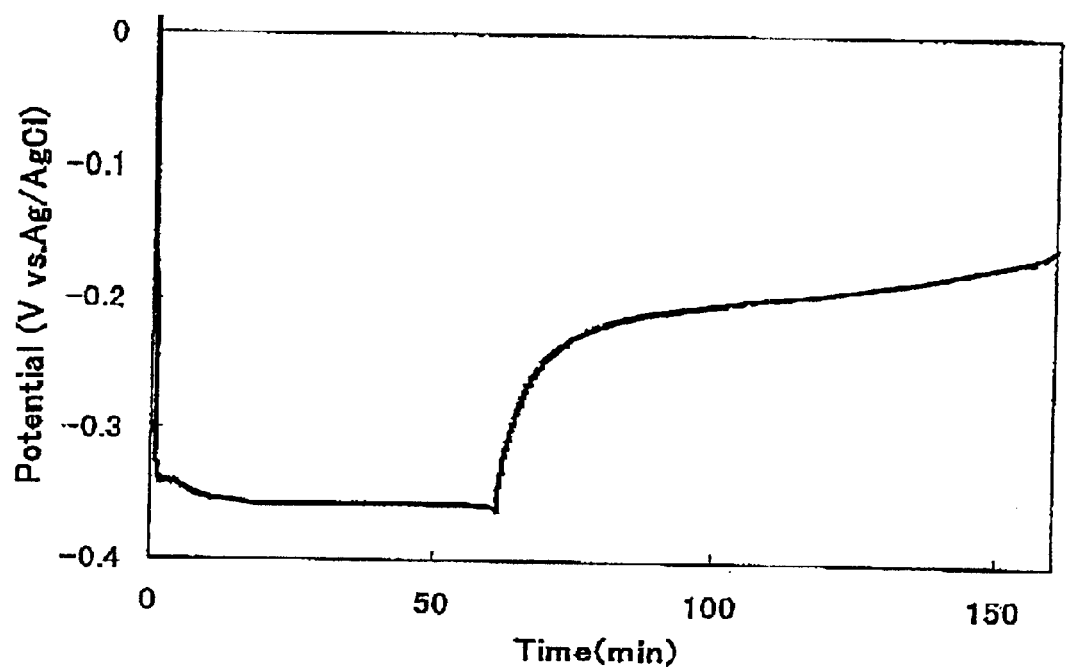
Potential change of a sample (TiO2 is applied on one half of a substrate of SUS304 and WO3 is applied on the other half)

[Fig.24]
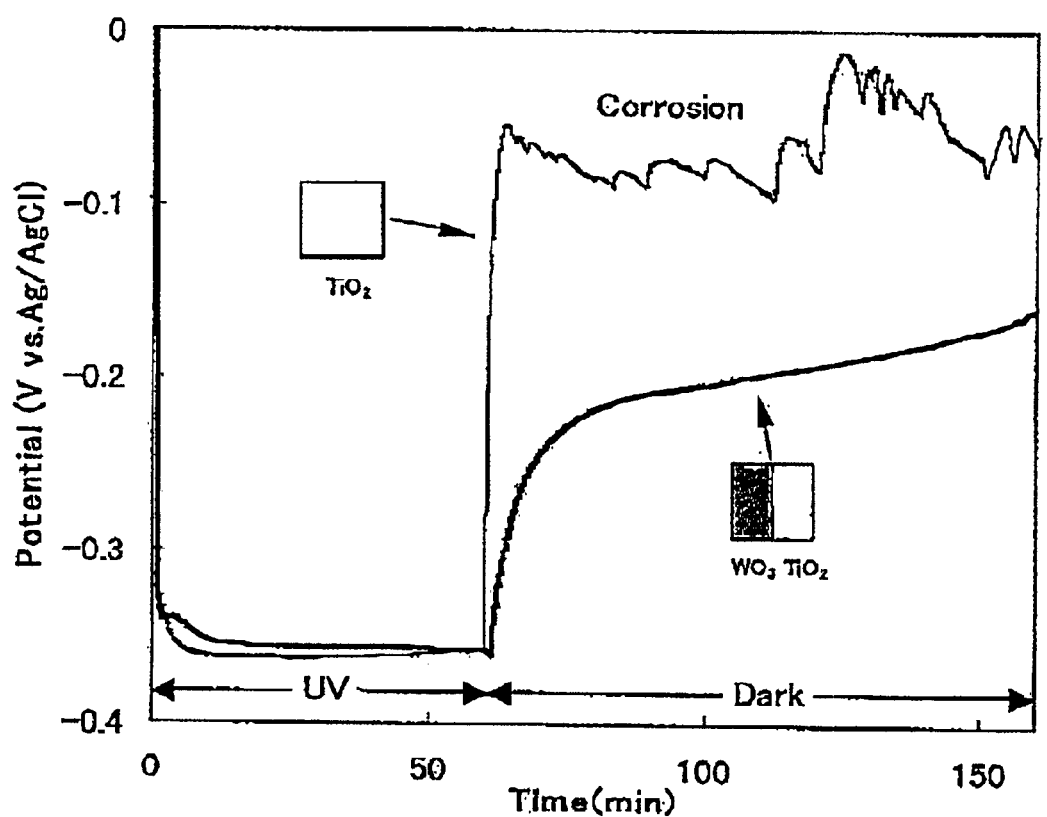

[Fig.25]
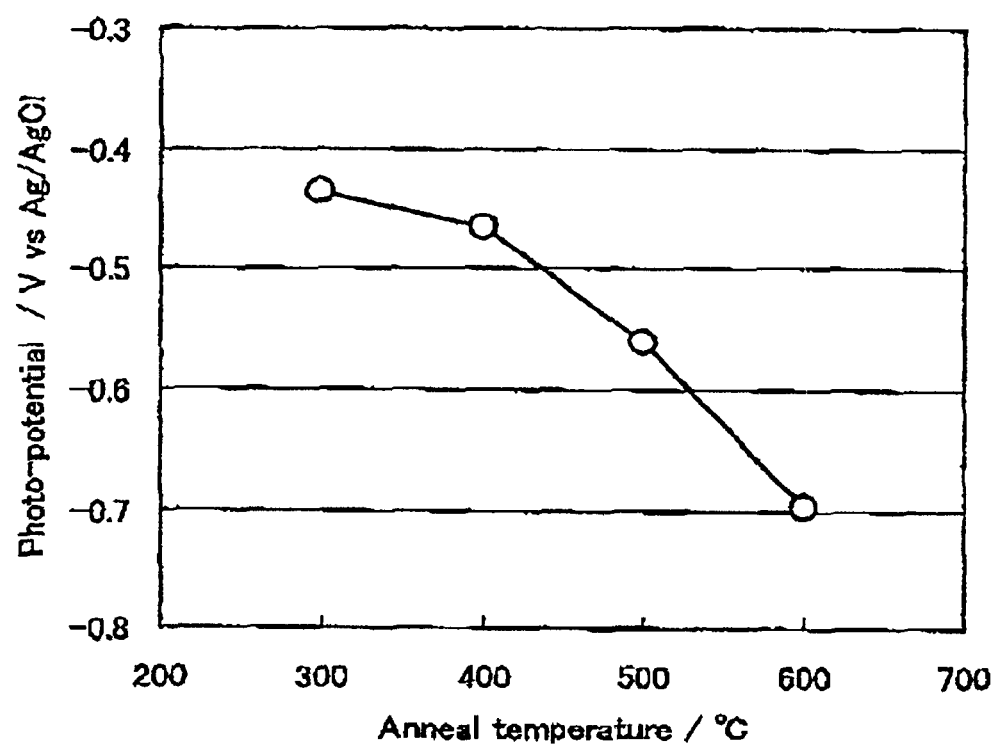

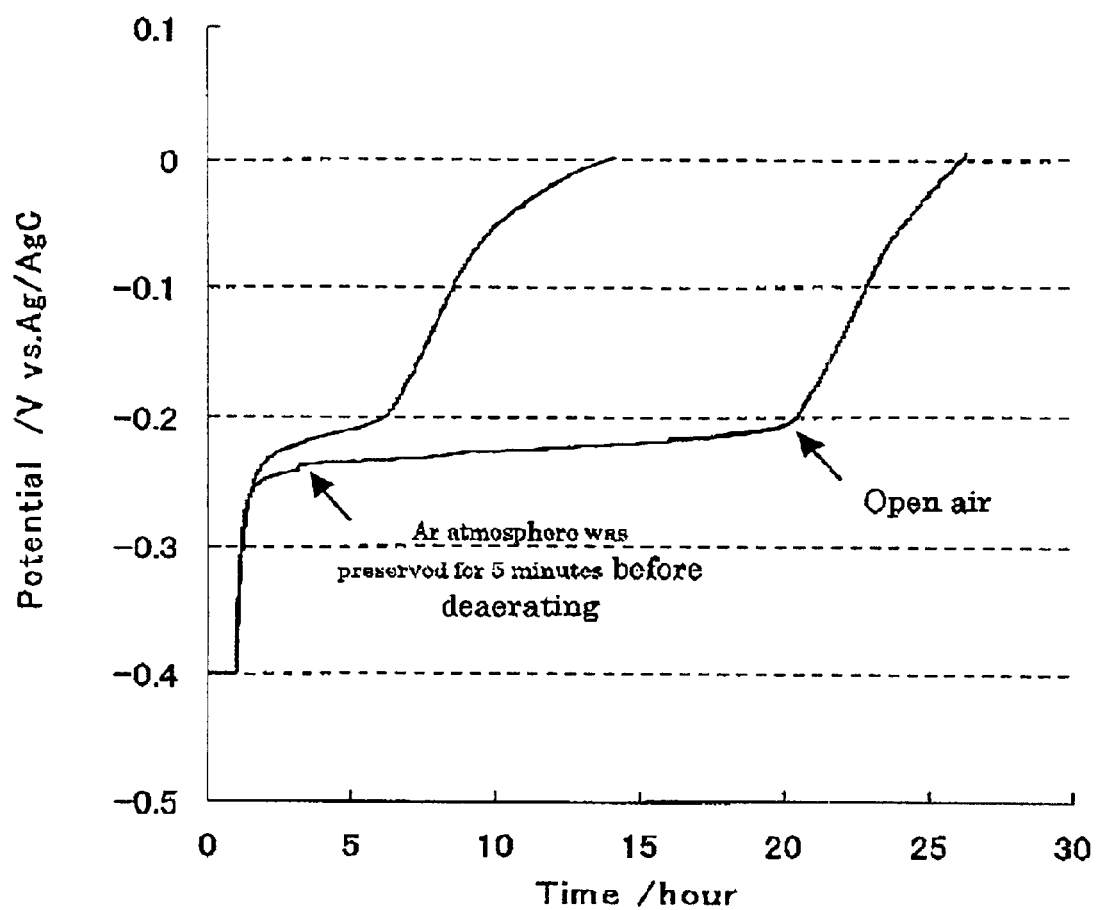
[Fig.26]

[Fig.27]
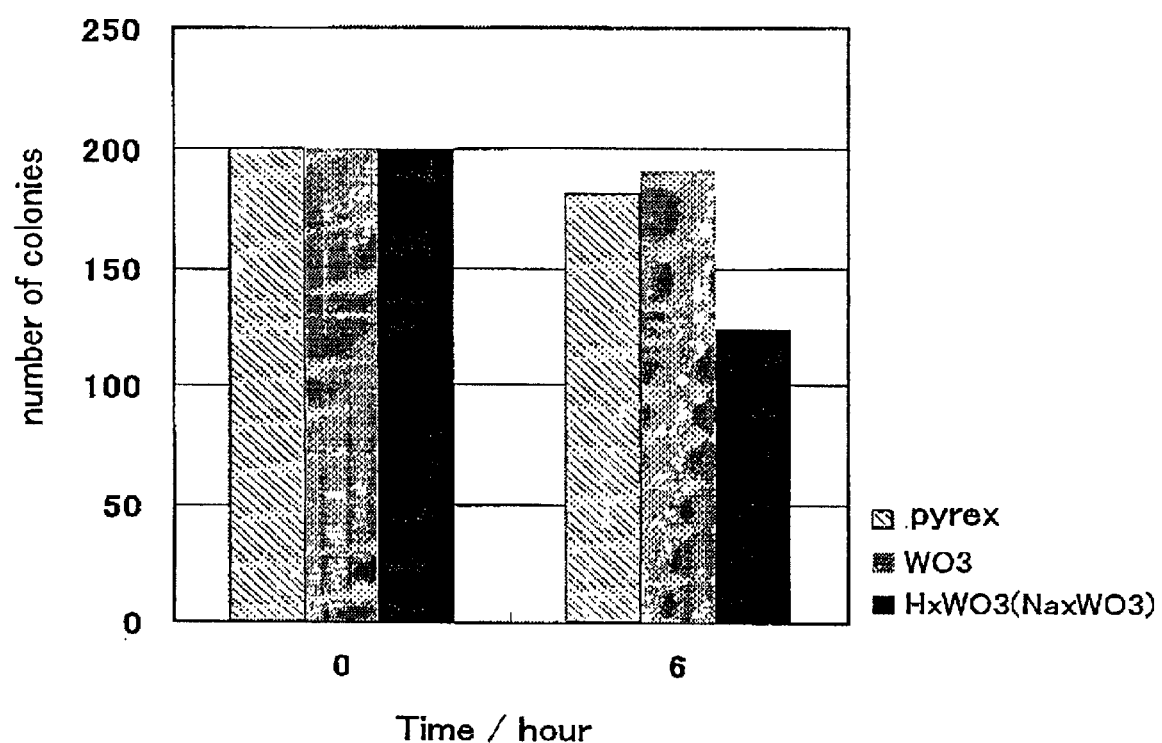

[Fig.28]
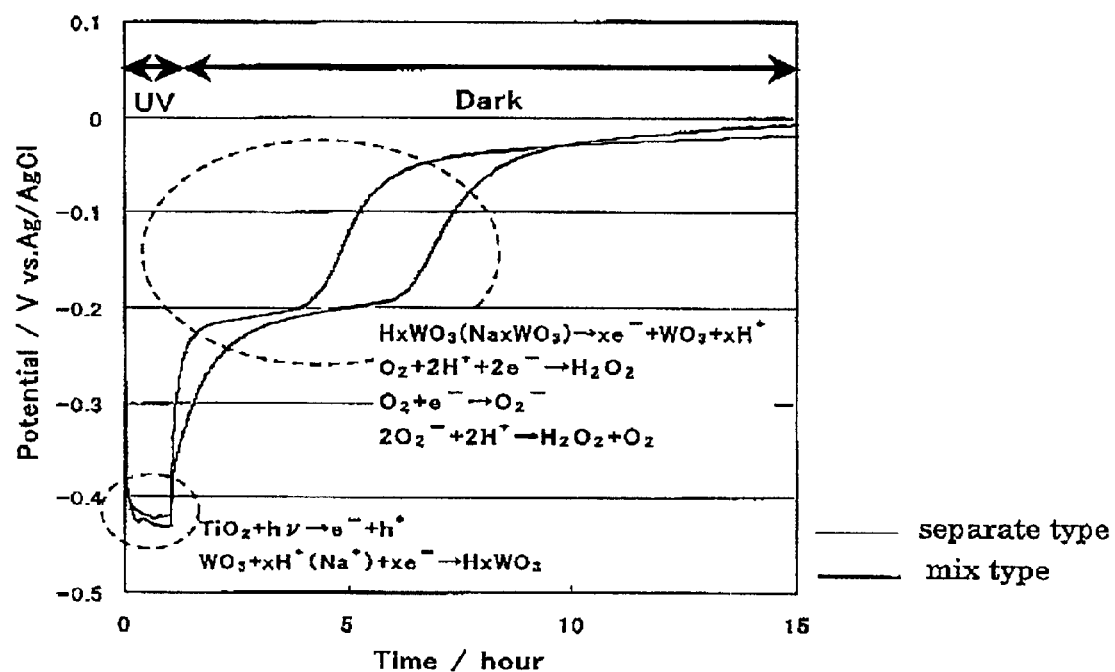

[Fig.29]
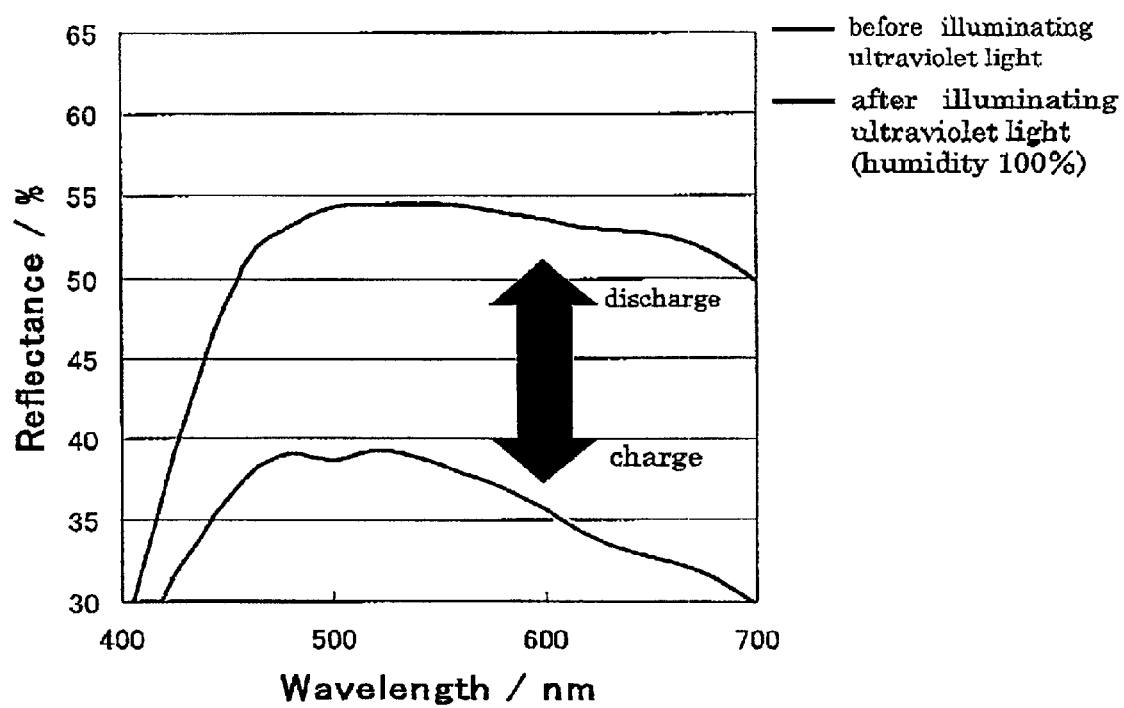

[Fig.30]
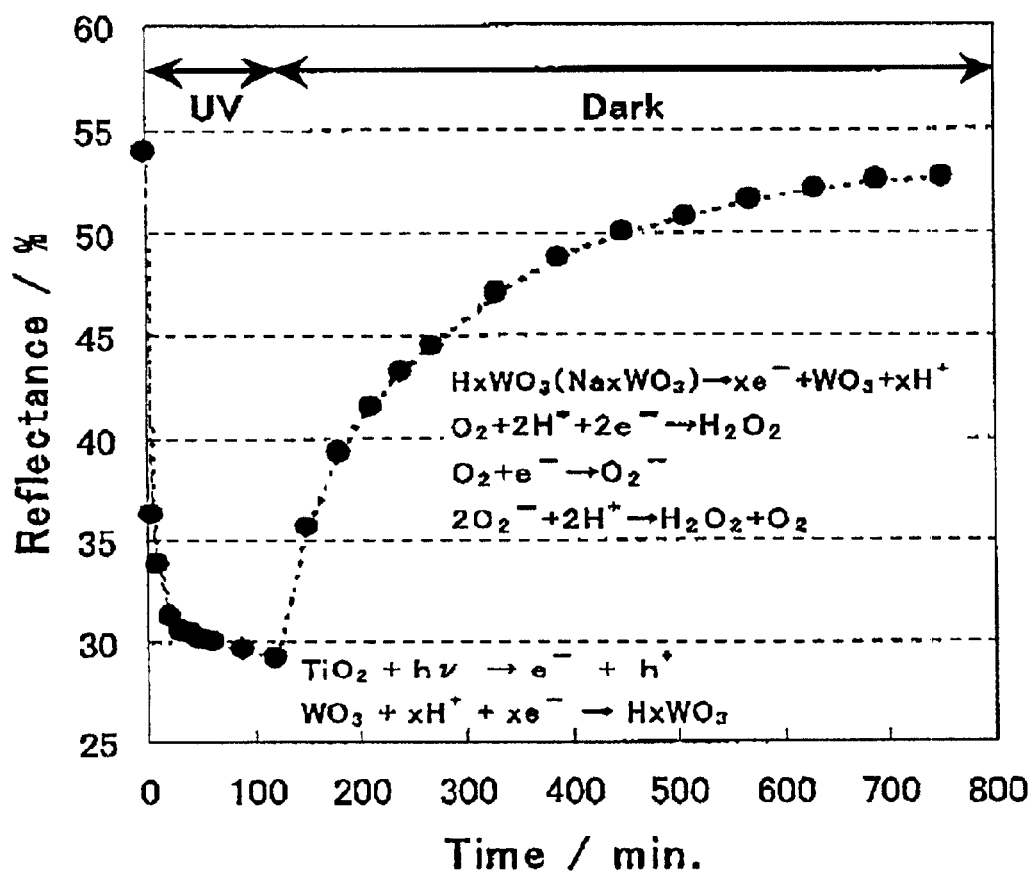

[Fig.31]
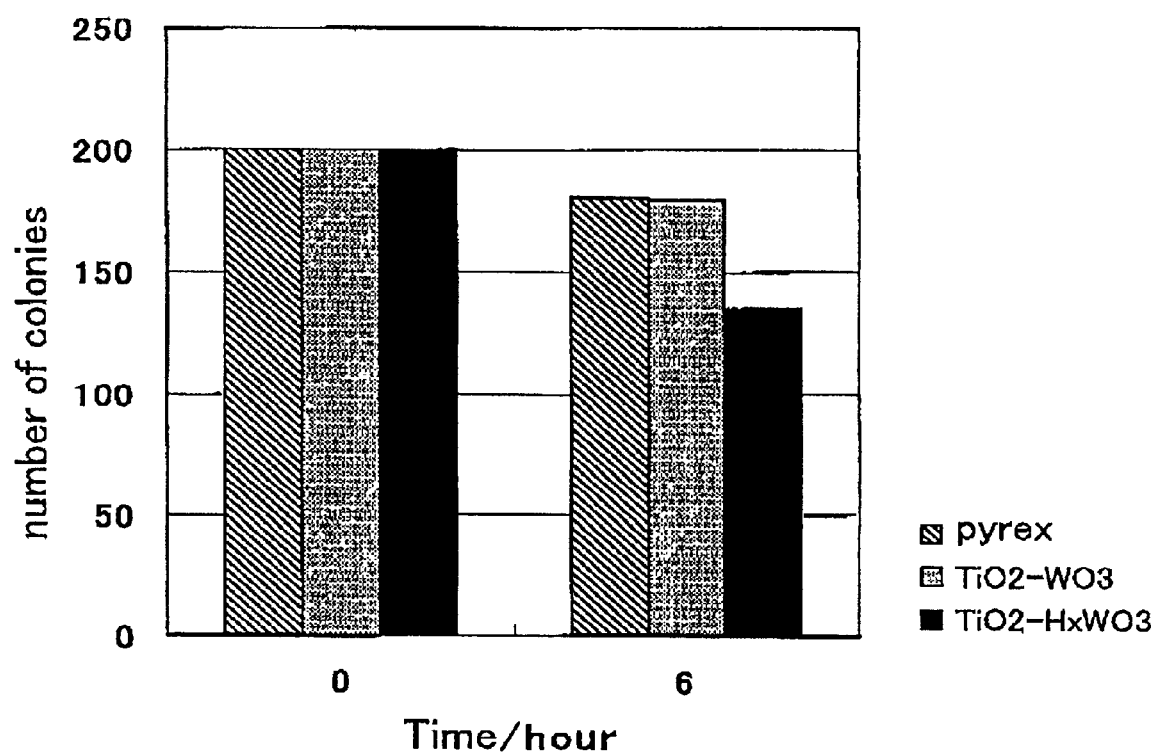

PHOTOREACTIVE DEVICES, TRANSLUCENT MEMBERS, ORNAMENTS, ANTICORROSIVE DEVICES, DEVICES FOR REDUCING OXYGEN AND DEVICES FOR CONTROLLING GROWTH OF MICROORGANISMS

BACKGROUND OF THE INVENTION

1. Field of the Invention

The invention relates to photoreactive devices, translucent members, ornaments, anticorrosive devices, devices for reducing oxygen and devices for controlling the growth of microorganisms.

2. Related Art Statement

Recently, it has been proposed a photo cathode anticorrosion process using a membrane of titanium dioxide. In Japanese patent application publication "Kokai" A 10153/1994, a film containing titanium dioxide in an equivalent amount of 1 $mg/m^2$ calculated as metal titanium is formed on the surface of a material of stainless steel. When irradiating light onto the surface of the stainless steel (that is, the surface of the film), the stainless steel acts as a cathode and the film acts as an anode, so that the immersion potential of the stainless steel shifts as large as −300 mV. The corrosion of the stainless steel may be prevented by the photo cathode process, according to the publication.

According to Japanese patent application "Kokai" A 71684/1999, the above membrane of titanium dioxide does not prevent the corrosion of the underlying stainless steel material when sufficient light intensity is not available. For overcoming this problem, an intermediate layer is formed between the stainless steel material and the surface film containing titanium dioxide. The intermediate layer contains a metal of iron, vanadium or copper. In such device, the metal contained in the intermediate layer may have a relatively lower valence under illumination (reduced) and a higher valence without illumination (oxidized), according to the publication. Therefore, it is stated that iron, copper or vanadium discharges electrons when the illumination is shut off and the discharged electrons are introduced into the underlying stainless steel material so as to maintain the anticorrosion effect without light.

On the other hand, tungsten oxide is reduced electrochemically and reacts with electrons and protons so that it is converted to its tungsten bronze structure and colored.

SUMMARY OF THE INVENTION

However, sunlight irradiated to tungsten oxide does not induce the conversion to the tungsten bronze structure sufficient for providing the color change easily visible by human eyes.

Contrary to the statement in the Japanese Patent application "Kokai" A 71684/1999, only few metal elements (iron, copper or vanadium) may be doped into titanium dioxide. The anticorrosion effect based on the change of valence of such small amount of metal elements may be negligible.

Of course, a metal, particularly a metal exposed to the environment, is subjected to corrosion at night. Therefore, it is needed to provide an anticorrosion device for effectively preventing the corrosion of a metal even at night.

Moreover, microorganisms, such as moulds, algae, bacteria and fungi, adhere and are grown on the surface of a structure made of a metal or the like over a long time period. It has not been known to effectively prevent the growth of the microorganisms with a relatively low cost Agents produced as byproducts of the reduction of oxygen, such as hydrogen peroxide or a superoxide, are known to prevent the growth of microorganisms. However, it has not been known a structure for generating such agents with stability, for example, under natural environment or atmosphere at a relatively low cost.

An object of the invention is to provide a novel photoreactive device responsive to light energy.

Another object of the invention is to provide a photoreactive device having an element made of a substance whose crystalline structure may be converted by applying light energy on the device.

Another object of the invention is to provide a method and device for effectively preventing the corrosion of a metal material with light irradiated and without light irradiated.

Another object of the invention is to provide a method and device for reducing oxygen by utilizing light energy.

Still another object of the invention is to provide a method and device for preventing or controlling the growth of microorganisms by utilizing light energy.

The invention provides a photoreactive device comprising:

a semiconductor having a conduction band with a potential and being capable of producing electrons by irradiating light on said semiconductor; and an oxidation-reduction material having a redox potential being positive compared with the potential of said conduction band, wherein said electrons produced by said semiconductor are supplied into the oxidation-reduction material under illumination so that said oxidation-reduction material is reduced and the crystalline structure of said material is converted for storing said electrons in the material with the converted crystalline structure. The invention further provides a method for storing electrons as described above.

The photoreactive device having the structure described above is a novel one capable of responding to light energy, preferably under the presence of a cation. It is thereby possible to store electrons in the reduced oxidation-reduction material having the converted crystalline structure and to discharge the stored electrons again.

BRIEF EXPLANATION OF THE ATTACHED DRAWINGS

FIG. 1(*a*) is a diagram schematically illustrating the principles of the invention and the motion of electrons under light, FIG. 1(*b*) is a diagram schematically showing the principles of the invention and the motion of electrons in the dark, FIG. 2(*a*) is a diagram for schematically showing an example of a device of the invention having a substrate 11, a layer 12 for storing electrons and a semiconductor layer 13 formed on the substrate 12, FIG. 2(*b*) is a diagram for schematically showing an example of a device of the invention having a substrate 11, a layer 14 for storing electrons formed on the substrate and a porous semiconductor layer 15 on the layer 14, FIG. 2(*c*) is a diagram for schematically showing an example of a device of the invention having a substrate 11 and a formed body 17 made from a mixture of powder 16 of a oxidation-reduction material and powder 17 of a semiconductor, FIG. 3(a) is a diagram schematically showing an example of a device of the invention having a first substrate 1A, a semiconductor layer 3 on the substrate 1A, a second substrate 1B and a layer 2 for storing electrons on the substrate 1B (the layers 2 and 3 are electrically connected with a electrical wire 5), FIG. 3(b) is a diagram schematically showing an example of a device of the invention having a first substrate 1A, a semiconductor layer 3 on the substrate 1A, a second substrate 1B and a layer 2 for storing electrons on the substrate 1B (the layers 2 and 3 are electrically connected with a wire 5), FIG. 4 is a graph showing the reflectance change of tungsten oxide before and after irradiating ultraviolet light in distilled water, FIG. 5 is a graph showing the reflectance change of a sample according to the example 1 (separate type: FIG. 2(a)) before and after irradiating ultraviolet light in distilled water, FIG. 6 is a graph showing the reflectance change of a sample according to the example 2 (mix type: FIG. 2(c)) before and after irradiating ultraviolet light in distilled water, FIG. 7 is a graph showing the reflectance change of tungsten oxide before and after irradiating ultraviolet light in gaseous phase, FIG. 8 is a graph showing the reflectance change of a sample according to the example 1 before and after irradiating ultraviolet light in gaseous phase, FIG. 9 is a graph showing the reflectance change of a sample according to the example 2 before and after irradiating ultraviolet light in gaseous phase, FIG. 10 is a graph showing the relationship of charge and color change in tungsten oxide in a sample according to the example 1, FIG. 11 is a graph showing the potential change of the samples according to the examples 1 and 2 before and after irradiating ultraviolet light in NaCl aqueous solution, FIG. 12 is a graph showing the reflectance change over time of the sample according to the example 2 before and after irradiating ultraviolet light in gaseous phase, FIG. 13 is a graph showing the relationship between light intensity of irradiated ultraviolet light and reflectance of TiO2—WO3 (in gaseous phase) in the sample according to the example 2, FIG. 14 is a graph showing the relationship between humidity and reflectance of TiO2—WO3 (gaseous phase) in the sample according to the example 2 with ultraviolet light irradiated, FIG. 15 is a graph showing the color changes before the surface treatment with NaCl, after the surface treatment and after rinsing, in the sample according to the example 2, FIG. 16 is a graph showing the color changes before the surface treatment with tungsten silicate, after the surface treatment and after rinsing, in the sample according to the example 2, FIG. 17 shows a cyclic voltamogram of an electrode made of WO3 (pH 1), FIG. 18 shows a cyclic voltamogram of an electrode made of WO3 (pH 5), FIG. 19 shows the results of an electrochromic reaction of an electrode made of WO3, and particularly shows the relationship between wavelength and reflectance with the applied voltage on the electrode changed (pH 1), FIG. 20 shows the results of an electrochromic reaction of an electrode made of WO3, and particularly shows the relationship between wavelength and reflectance with the applied voltage on the electrode changed (pH 5), FIG. 21 is a graph showing the effects on the electrochromic reaction of WO3 electrode of the connection between a titanium dioxide electrode and the WO3 electrode, FIG. 22 is a graph showing the potential change over time when a titanium dioxide electrode and WO3 electrode are connected, light is irradiated for 60 minutes and then the irradiation is terminated, FIG. 23 is a graph showing the potential change of a sample having a SUS substrate, titanium dioxide electrode and WO3 electrode formed on the substrate, when light is irradiated for 60 minutes and then the irradiation is terminated, FIG. 24 is a graph showing the comparison of the potential change shown in FIG. 23, with potential change of a sample having a SUS substrate and titanium dioxide electrode on the substrate without forming WO3 electrode, FIG. 25 is a graph showing the relationship between annealing temperatures of a film and potential of electrode under illumination in a sample having an electrode made of mixture of titanium dioxide and strontium oxide, FIG. 26 is a graph showing the potential change over time of WO3 electrode with or without deaeration with argon, FIG. 27 is a bar graph showing the activity for suppressing the growth of microorganisms after reducing WO3, FIG. 28 is a graph showing the potential change of samples according to the examples 1 and 2 with or without ultraviolet light irradiated, FIG. 29 is a graph showing reflectance of visible light of the sample according to the example 2 with or without ultraviolet light irradiated, FIG. 30 is a graph showing the reflectance change of visible light over time of the sample according to the example 2 when ultraviolet light is irradiated and the irradiation is then terminated, and FIG. 31 is a graph showing the results of a test for evaluating the suppressing effect of growth of microorganisms of the samples according to the example 2 and a comparative example.

EMBODIMENTS OF THE INVENTION

In one embodiment of the invention, an oxidation-reduction material may be reduced in the presence of a cation so that its crystalline structure is converted. When irradiating light, a semiconductor discharges electrons, which are supplied into the oxidation-reduction material to reduce the material and convert its crystalline structure.

First, the principle of a photoreactive device according to the invention will be described referring to FIGS. 1(a) and 1(b). In the embodiment shown in FIG. 1, a metal member is interposed between a semiconductor and a oxidation-reduction material (for example, an electrochromic material: so called EC material). As shown in FIG. 1(a), when irradiating light, the semiconductor is excited from its ground state (level) to conductive state by absorbing photons. The potential of the conductive state is negative compared with the corrosion potential of a metal material. The electrons discharged from the semiconductor are supplied to the metal material and reduce it so as to maintain the potential of the metal material negative compared with its corrosion potential. Simultaneously, the metal material discharges electrons, which are then supplied into the oxidation-reduction material. The oxidation-reduction material absorbs the electrons and cations from outside to induce the conversion of its crystalline structure and store the electrons and cations.

When terminating the irradiation of light, as shown in FIG. 1(b), the potential of the semiconductor shifts positive. The oxidation-reduction material is oxidized and discharges the stored electrons and cations so that its crystalline structure is converted to its original state. The discharged electrons and cations are supplied into the metal material and environment including oxygen molecules. Such conversion of the crystalline structure of the oxidation-reduction material may be induced without the necessity of applying a voltage using a power supply. Further, such conversion may be repeatedly induced. It is thereby possible to detect or utilize the conversion of the crystalline structure of the oxidation-reduction material.

For example, the conversion of the crystalline structure may induce the following physical changes and/or chemical changes.

(1) The reflectance of light, for example visible light, is increased or decreased.

(2) The distribution of reflectance over frequency is changed, thus providing visible color change.

(3) The electrical resistance of the material is changed when irradiating light.

In the schematic diagram of FIG. 1(a), the electrons are supplied from the semiconductor to the oxidation-reduction material through the metal material. However, the electrons may be directly transferred from the semiconductor into the oxidation-reduction material without passing through the metal material.

A second embodiment of the invention provides a method for preventing the corrosion of a metal material when irradiating light and when not irradiating light. In the embodiment, a semiconductor and an electrochromic material are utilized. The semiconductor is excited to discharge electrons. The electrochromic material has a redox potential being positive compared with the potential of the conduction band of the semiconductor. When irradiating light, the discharged electrons are supplied into the metal material and electrochromic material for storage. When the irradiation is terminated, the stored electrons are discharged from the electrochromic material and introduced into the metal material.

The principle of a photoreactive device according to the second embodiment of the invention will be described referring to FIGS. 1(a) and 1(b) again.

As shown in FIG. 1(a), when irradiating light, the semiconductor is excited from its ground state to conductive state. The potential of the conductive state is negative compared with the corrosion potential of a metal material. The electrons discharged from the semiconductor are supplied to the metal material and reduce it so as to maintain the potential of the metal material negative compared with its corrosion potential. Simultaneously, the metal material discharges electrons, which are then supplied into the electrochromic material. The electrochromic material absorbs the electron, and preferably absorbs protons from outside to induce the conversion of its crystalline structure to bronze structure and store the electrons and protons. Such conversion may also induce the change of absorption spectrum of visible light.

When terminating the irradiation of light, as shown in FIG. 1(b), the potential of the semiconductor shifts positive. The electrochromic material discharges the stored electrons, which are supplied into the metal material so as to maintain the potential of the metal material negative compared with the corrosion potential, providing protection against the corrosion of the metal. This process is a practical method for preventing the corrosion of a metal material in the dark and may be useful in industries.

The redox potential of the electrochromic material must be more negative than the corrosion potential of the metal material, as shown in FIG. (b). It is thereby possible to supply electrons into the metal material when light is not irradiated. The redox potential of the electrochromic material must be more positive than the potential of conductive band of the semiconductor. It is thereby possible to supply the electrons discharged from the semiconductor into the electrochromic material, when the semiconductor is excited by irradiation, as shown in FIG. 1(a).

In the schematic diagram of FIG. 1(a), the electrons are supplied from the semiconductor to the electrochromic material through the metal material. However, the electrons may be directly transferred from the semiconductor into the electrochromic material without passing through the metal material.

A third embodiment of the invention provides a device and method for reducing oxygen. In this embodiment, a semiconductor and an oxidation-reduction material are utilized. The semiconductor is excited to discharge electrons. The oxidation-reduction material has a redox potential being positive compared with the potential of the conduction band of the semiconductor. When irradiating light, the discharged electrons are supplied into the oxidation-reduction material for reducing it. When light is not irradiated, the electrons are discharged from the oxidation-reduction material and supplied into oxygen molecules around the material to reduce the molecules.

A fourth embodiment according to the invention provides a device and method for controlling the growth of microorganisms. In this embodiment, it is used a metal oxide which may be reduced so that its crystalline structure is converted to tungsten bronze structure. The metal oxide is reduced by supplying electrons. The reduced metal oxide is then oxidized to discharge electrons, which then reduce oxygen molecules around the metal oxide to suppress the growth of microorganisms. It has not been successfully performed to actually suppress the growth of microorganisms by applying such principle.

The principle of a photoreactive device according to the third and fourth embodiments of the invention will be described referring to FIGS. 1(a) and 1(b). As shown in FIG. 1(a), when irradiating light, the semiconductor is excited from its ground state to conductive state. The potential of the conductive state is negative compared with the corrosion potential of a metal material. The electrons discharged from the semiconductor are supplied to the metal material and reduce it so as to maintain the potential of the metal material negative compared with its corrosion potential. Simultaneously, the metal material discharges electrons, which are then supplied into the oxidation-reduction material. The material absorbs the electron and protons from outside to induce the conversion of its crystalline structure to bronze structure and store the electrons.

When terminating the irradiation of light, as shown in FIG. 1(b), the potential of the semiconductor shifts positive, and the electrochromic material discharges the stored electrons. It is found that the discharged electrons may react with oxygen molecules around the oxidation-reduction material to reduce the oxygen molecules. Such reduction may induce the formation of hydrogen peroxide and superoxides useful for suppressing the growth of microorganisms. Moreover, such reduction process of oxygen molecules may be repeatedly induced without the necessity of applying a voltage by a power supply. The device may provide antifouling protection of the surface, for example of a structure or the like, over a long period of time by a relatively low operating cost.

A conductive material, particularly metal material, may be interposed between the semiconductor and oxidation-reduction material. The oxidation-reduction material has a redox potential being positive compared with the potential of conductive band of the semiconductor. It is thereby possible to supply electrons from the semiconductor into the oxidation-reduction material as shown in FIG. 1(a), when light is irradiated to excite the semiconductor.

In the schematic diagram of FIG. 1(a), the electrons are supplied from the semiconductor to the oxidation-reduction material through the metal material. However, the electrons may be directly supplied from the semiconductor into the oxidation-reduction material without passing through the metal material.

In the invention, a semiconductor discharges electrons when illuminating light. Such semiconductor includes $TiO_2$, $SrTiO_3$, $Fe_2O_3$, CdS, CdSe, $ZrO_2$, GaP, SiC, Si, $Nb_2O_5$, ZnO, $WO_3$, $SnO_2$ or the like. $TiO_2$, $SrTiO_3$ and SiC are most preferable.

For carrying out the invention, it is necessary to irradiate light with a wavelength capable of exciting the semiconductor to its excited state and discharge electrons from the semiconductor. Any kinds of light without such capability may be or may not be irradiated on the inventive device at any time. It does not constitute the requirement of the invention whether any light without the capability of exciting the semiconductor is irradiated or not.

In the invention, an electrochromic material is reduced under reducing condition in the presence of proton or the like and absorbs electrons and the protons to form bronze-type crystalline structure. The material discharges the electrons under oxidizing condition to form the original crystalline structure. The oxidation-reduction reaction is reversible. The material may exhibit one particular color under reducing condition and another color under oxidizing condition. Such material includes a metal oxide such as $WO_3$, $MoO_3$, $Nb_2O_5$, $V_2O_5$, $IrO_x$, $TiO_2$, $NiO_x$, $Cr_2O_3$, $WO_3$-$MoO_3$. The electrochromic material may preferably be of a complete coloring type, and preferably be $WO_3$, $MoO_3$, $Nb_2O_5$, $TiO_2$ or $WO_3$—$MoO_3$.

In a preferred embodiment of the invention, an electrochromic material may be reduced in reducing condition in the presence of cation such as proton, so that the material forms tungsten bronze structure. Such material with tungsten bronze structure is a chemical substance having the substantially same crystalline structure as tungsten bronze ($H_xWO_3$) ($0<x\leq1$). When "x" is zero, the compound exhibits bronze color. A number of compounds were found to be of tungsten bronze crystalline structure. Some of such compounds may be represented as the following general formula: $A_xB_yO_z$. In the formula, "A" is H, an alkali metal, an alkaline earth metal or the ion of a metal such as Cu, Sn, Pb or the like, and "B" is the ion of a metal such as Mo, Nb, Re, Ti or V.

One embodiment of the invention will be described further in detail, where titanium dioxide is used as a semiconductor and tungsten oxide is used as an electrochromic material. In this embodiment, $WO_3$ is reduced to form bronze crystalline structure by means of strong reducing effect of $TiO_2$ under irradiation, either in liquid phase or in gaseous phase. $WO_3$ has lemon color. Reduced $WO_3$ with tungsten bronze crystalline structure becomes blue and its reflectance becomes lower as a whole. Such color change is negligible without providing $TiO_2$. The followings are the reaction schemes.

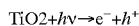

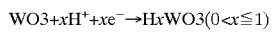

In the dark, $WO_3$ is naturally oxidized and discharge electrons, which reduce oxygen molecules in liquid phase or gaseous phase to form superoxides and hydrogen peroxide: These products have activities such as antibacterial, antimicrobial and antitumor activities. The followings are the reaction schemes.

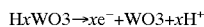

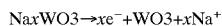

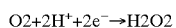

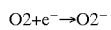

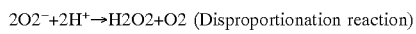 (Disproportionation reaction)

In the invention, the construction and form of a semiconductor and oxidation-reduction material, as well as their geometrical relationship, are not particularly limited. However, the semiconductor is provided in a position to which light may be irradiated. The oxidation-reduction material is provided so that it may absorb cations and may preferably be contacted with a source of cations.

The cation includes proton, the ion of an alkali metal such as sodium and potassium, the ion of an alkaline earth metal such as calcium and magnesium, the ion of a transition metal such as Cu, Sn, Pb. The cation may preferably be proton, or an ion of a metal element, which may replace the cation site of the tungsten bronze crystalline structure. A source of proton includes moisture contained in atmosphere, water, liquid containing moisture, solid containing moisture, and gel, sol or slurry containing moisture. A source of a metal ion includes a metal compound dissolved or dispersed into water. The metal compound includes a metal hydroxide, a metal chloride, a metal sulfide, a metal nitride and a metal phosphate.

The devices according to the invention may preferably be constructed as follows.

(1) A layer for storing electrons made of a oxidation-reduction material and a semiconductor layer are provided on a substrate with any shapes. In this case, the layer for storing electrons and semiconductor layer may preferably be not overlapped on the substrate. FIG. 2(a) shows one example of such device. A layer 12 for storing electrons and semiconductor layer 13 are formed alternately on the surface of a substrate 11, for example, made of a metal. The layers 12 and 13 are not laminated or overlapped. In this embodiment, the substrate 11 may preferably be of a material with a conductivity as large as possible, and may preferably be made of ITO glass, $SnO_2$, a glass, or a metal. A conductive layer 6 may be formed on the substrate 11 and the layers 12 and 13 may be provided on the conductive layer 6. In said second embodiment of the invention, the substrate 11 contains at least a metal material to be treated for preventing corrosion.

(2) A layer for storing electrons and a porous semiconductor layer formed on the layer for storing electrons are provided on a substrate. FIG. 2(b) shows one example of this embodiment. A layer 14 for storing electrons is formed on a substrate 11 and a semiconductor layer 15 is formed on the layer 14. The semiconductor layer 15 is porous so that the surface of the layer 14 may contact with the outer environment. In the second embodiment of the invention, the substrate 11 has at least a metal material to be treated for preventing corrosion.

(3) The inventive photoreactive device is provided as a formed body made of powder of an oxidation-reduction material and powder of a semiconductor. The formed body may be heat treated or even sintered. Alternatively, powder of an oxidation-reduction material and powder of a semiconductor may be mixed to provide a mixture, which may be solidified using a binder or compressed to provide a compressed body. FIG. 2(c) shows one example of this embodiment. A formed body 18 is provided on a substrate 11. The formed body is made of a mixture of powder 16 of an oxidation-reduction material and powder 17 of a semiconductor. The substrate 11 may be omitted from the inventive device. Moreover, after forming the formed body 18 on the substrate 11, the formed body 11 may be removed from the formed body 18. In the second embodiment of the invention, the substrate 11 has at least a metal material to be treated for preventing corrosion.

The device according to the embodiment (2) or (3), particularly the embodiment (3), are considered to have higher efficiency for storing electrons, because the semiconductor (a source for discharging electrons) and the oxidation-reduction material (a source for absorbing the discharged electrons) are located near. Particularly when the oxidation-reduction material is contacted with gaseous phase such as outer atmosphere and is not contacted with liquid phase, it is preferred to employ a device with a small distance between the oxidation-reduction material and semiconductor. In this point of view, it is preferred the devices according to the embodiments (2) and (3).

(4) A semiconductor layer is provided on a first substrate, an oxidation-reduction material is provided on another substrate, and the semiconductor and oxidation-reduction material are electrically connected. In the second embodiment of the invention, the second substrate has at least a metal material to be treated for preventing corrosion.

In this embodiment, for example as shown in FIG. 3(a), a semiconductor layer 3 is provided on a first substrate 1A, an oxidation-reduction material 2 is provided on a second substrate 1B, and the semiconductor 3 and oxidation-reduction material 2 are electrically connected with a electrical cable 5. Alternatively, as shown in FIG. 3(b), a conductive layer 6A is provided on the first substrate 1A and the semiconductor layer 3 is formed on the layer 6A. Another conductive layer 6B is provided on the substrate 1B and the oxidation-reduction material 2 is provided on the layer 6B. The layers 6A and 6B are electrically connected with an electrical cable 5.

A semiconductor layer or film may be formed by a process including dip coating, spray coating, spray pyrolysis, spin coating, bar coating, brush coating, sputtering and vacuum evaporation. A layer or film of a oxidation-reduction material may be formed by a process including dip coating, spray coating, spray pyrolysis, spin coating, bar coating, brush coating, sputtering and vacuum evaporation. Such applied films may preferably be heat treated at a temperature not higher than 500° C.

The films may preferably be formed as follows.

(1) Sol of an organic compound dissolved in a solvent is applied on a substrate, for example metal substrate, and subjected to pyrolysis. The organic compound includes titanium alkoxide and bis-(2,4-pentanedionato) titanium oxide (acetylacetone titanium oxide). The solvent includes an organic solvent such as ethanol.

(2) Sol or slurry made of fine particles of a metal oxide dispersed in a solvent is applied on a substrate, for example metal substrate, and heated to solidify the sol or slurry. The fine particles may preferably have a diameter of 1 nm to 10 $\mu$m.

(3) A film is formed on a substrate by thermal spraying or sputtering.

The material for a substrate is not particularly limited, and may be a metal bulk or a plastic material such as polyethylene, polypropylene, polyester and polyacrylonitrile. A metal material to be protected from corrosion is not particularly limited, and may preferably be stainless steel, carbon steel and a steel plated with a metal. Such metal for plating includes zinc, zinc-iron, zinc-aluminum, aluminum and chromium.

In the anticorrosive device and method according to the second embodiment of the invention, another substrate for providing said film may be used in addition to the metal material to be protected from corrosion. Such another substrate may be made of a material including a metal bulk (for example metal plate). The another substrate may be a film made of a plastic material such as polyethylene, polypropylene, polyester and polyacrylonitrile. In this case, the film may be easily constructed by applying the film onto an appropriate construction or building. Such film may be easily replaced by a new film. Such separate structure for applying the film includes a prepared structure such as a gas tank.

When using a metal material as a substrate, it is possible to form a anticorrosion film, particularly sacrifice anticorrosion film, may be provided onto the surface of the substrate. The anticorrosion film may be made of any known material being preferably be one of the following examples.

Oil paint; nitrocellulose lacquer; (clear lacquer, lacquer enamel, high solid lacquer, hot lacquer, special lacquer); synthetic resin paint (phthalic acid resin paint, aminoalkid resin paint, epoxy resin paint, vinyl resin paint, polyurethane resin paint, unsaturated polyester resin paint, acrylic resin paint, chloride rubber resin paint, water paint, silicon resin paint, fluorine contained resin paint): paints with specific properties (powder paint, electrodeposition paint, vinyl sol paint, non-aqueous dispersion paint, ultraviolet curable resin paint, electron beam curable resin paint); paint for specific appearance (metallic paint, multi-color paint).

In the fist embodiment of the invention, when an oxidation-reduction material contacts liquid phase such as water or liquid containing water, protons contained in water and cations derived from inorganic compounds dissolved or dispersed in water are easily supplied to the oxidation-reduction material. However, when the material is set in gaseous phase and does not contact liquid phase, it is generally difficult to supply protons and the other cations to the material. In this case, water content (moisture) contained in atmosphere is the main source for supplying protons to the material. Therefore, if the humidity in the atmosphere is low, only a small amount of protons are available for the supply, so that the color change of the material is not considerable or distinguishable color change hardly takes place. When the humidity is high, the color change becomes apparent or considerable, even with the same light intensity. Therefore, the photoreactive device according to the first embodiment of the invention may be used as a humidity sensor when light intensity is substantially constant.

However, the device according to the first embodiment of the invention may be used as a sensor for detecting light intensity, or may be used as a device for exhibiting color change depending on the light intensity of irradiated light on it. In these cases, it is preferred that the change of property of the oxidation-reduction material is not easily affected by the humidity of atmosphere. Moreover, when humidity of atmosphere is low, it is preferred to supply a sufficient amount of electrons to the material for inducing the change of property.

The following techniques may be applied from these points of view.

(1) Solution, for example aqueous solution, is set near the inventive device, or solution is provided so that it may be supplied to the inventive device.

(2) A system for maintaining humidity of the surrounding atmosphere of the inventive device constant. For example, the inventive device may be contained within a container having an apparatus for adjusting the humidity in the container. Alternatively, a humidifier or dehumidifier may be set near the inventive device.

(3) An ionic conductor for a cation is provided in the inventive device for improving the ionic conductivity on the surface of or within a film or membrane made of an oxidation-reduction material or semiconductor. The ionic conductor may be a film or membrane for covering the surface of an oxidation-reduction material or semiconductor. Alternatively, the ionic conductor may be contained in the semiconductor and/or oxidation-reduction material.

Most of substances improving the conductivity of a cation may be used as the above ionic conductor. However, the ionic conductor may preferably be water proof, or may preferably be reacted with water to produce a hydrate which then remains within the inventive device. Such cation conductor may preferably be a heteropolyacid crystal. A heteropolyacid is known to be a proton conductor and includes tungsten silicate, molybdenum silicate, phosphotungstic acid, phosphomolybdic acid, molybdopyrophosphoric acid, molybdovanadic acid and molybdophosphorous acid.

It is possible to apply a photoreactive device according to the first embodiment to a translucent device made of a translucent substance, providing a translucent device whose color may be changed depending on light intensity, particularly intensity of ultraviolet light. Such translucent device includes, but not limited to, a car window, a window of a construction, sunglasses, spectacles, contact lens, and a displaying window of a watch.

The applications of the above sensor for detecting light intensity according to the first embodiment are not particularly limited, and may be attached onto the outer wall of a construction and coated surfaces of a car. It is also possible to attach the sensor for detecting light intensity onto an object fixed on a human body and to show light intensity of ultraviolet light irradiated on the human body by the change of its color. It is also possible to attach the sensor for detecting light intensity of ultraviolet light onto a livestock animal and to visualize light intensity of ultraviolet light irradiated from the sun to the livestock.

The photoreactive device according to the first embodiment of the invention may be utilized as an ornament. Preferably, such ornament may have an oxidation-reduction material, whose absorption spectrum of visible light may be changed to exhibit recognizable color change, depending on the intensity of light such as ultraviolet light or infrared radiation. It is possible to attach the device according to the invention onto the surface of an ornament and cover it, so that the ornament may exhibit color change depending on the light intensity irradiated on it. Such ornament includes a decorative object to be directly attached or provided on a human body, such as a jewel, a substrate for fixing a jewel, a necklace and earring, and an object to be carried with a human body such as shoes and bags. The ornament may be an artificial gem constructed by the inventive device only.

EXAMPLES

Example 1

Device According to the First, Second and Third Embodiments was Prepared: Separate Type A photoreactive device (separate type) shown in FIG. 2(a) was manufactured., A substrate made of glass 11 with an ITO 6 was prepared. The main face of the substrate 11 was divided into two halves each having the same area. 300 ml of ethanol solution dissolving 0.05 M of bis-2,4-pentanedionato titanium oxide (acetylacetone titanium oxide) was subjected to spray pyrolysis at 300° C. on the first half of the main face of the substrate to form a film of titanium dioxide 13. It was also prepared a dispersion containing silica binder ([NDC-100] available from Nippon Soda corporation) and fine particles (with diameter of 500 nm) of WO3 dispersed in a density of 0.116 g/ml. The dispersion was applied on the remaining half of the main face to form a film, which was then fired at 200° C. for 30 minutes.

Example 2

Device According to the First, Second and Third Embodiments was Prepared: Mix Type A photoreactive device (mix type) shown in FIG. 2(c) was manufactured. A substrate made of glass 11 with an ITO 6 was prepared. To 200 ml of ethanol solution dissolving 0.05 M of bis-2,4-pentanedionato titanium oxide (acetylacetone titanium oxide), 0.232 g of fine particles (with diameter of 500 nm) of WO3 were added and stirred to obtain dispersion. The dispersion was then coated onto the main face of the substrate 11 to form film which was then subjected to spray pyrolysis at 300° C. WO3 bulk is of ortho rhombic system and lemon color. However, a film made of WO3 may be white or transparent, depending on the thickness of the film and diameter of fine particles.

(Sample According to Comparative Example 1)

It was prepared a dispersion containing silica binder ([NDC-100A] available from Nippon Soda corporation) and fine particles (with diameter of 500 nm) of WO3 dispersed in a density of 0.116 g/ml. The dispersion was applied on the surface of a conductive glass substrate (ITO) to form a film, which was then fired at 200° C. for 30 minutes.

(Experiment A for Evaluation as a Photoreactive Device: Reflectance Change of WO3 and TiO2—WO3 System Before and After Irradiating Ultraviolet Light in Distilled Water)

The above samples according to the examples 1 and 2 and comparative example 1 were immersed into distilled water with a pH of 7, respectively. Ultraviolet light was irradiated to each of the samples using a mercury-xenon lamp ([LA-200UV] supplied by Hayashi watch works co. Ltd.: with a wavelength of 360 nm and a light intensity of 10 mW/cm2). The reflectance change of each device before and after the irradiation was measured with [handy-color-COLORIMETER] (available from BYK-GARDNER in the United States). The results were shown in FIGS. 4, 5 and 6.

Each drawing shows the reflectances before and after the irradiation for each device.

As a result, as shown in FIG. 4, in the comparative example, the reflectance was not substantially changed under the irradiation. As shown in FIG. 5, in the sample according to the example 1, the reflectance was substantially reduced when irradiating ultraviolet light, and the distribution of reflectances over wavelengths was changed, providing the color shift. As shown in FIG. 6, in the sample according to the example 2, the reflectance was further reduced under the irradiation of ultraviolet light, providing more substantial color change.

(Experiment B for Evaluation as a Photoreactive Device: Reflectance Change of WO3 and TiO2—WO3 Under the Irradiation of Ultraviolet Light in Gaseous Phase)

As the experiment A, the reflectance change of each of the samples according to the experiments 1, 2 and comparative experiment 1 was measured. Each sample was set in an atmosphere with a humidity of 100 percent instead of using distilled water in the example A.

As a result, as shown in FIG. 7, the reflectance of the sample according to the comparative example did not substantially changed. In the sample according to the example 1, as shown in FIG. 8, the reflectance was somewhat reduced under the irradiation of ultraviolet light, although the change was relatively small compared to the reflectance change shown in FIG. 5 in the case of liquid phase. As shown in FIG. 9, the reflectance change of the sample according to the example 2 was conspicuously increased under the irradiation of ultraviolet light, with the color change further distinguishable. As shown above, by using a formed body consisting of powder of the semiconductor and powder of oxidation-reduction material as shown in FIG. 2(c), the oxidation-reduction material exhibited considerable structural change even in gaseous phase. The reasons are as follows. The semiconductor and oxidation-reduction material is located near and even contacted microscopically, so that electrons may move easily between the materials. Moreover, such microstructure is designed for easily utilizing moisture content in atmosphere.

(Experiment C: Relationship of Charge in WO3 and Color Change: Evaluation as a Photoreactive Device)

The relationship of the charge and color change was measured using the sample of separate type according to the example 1. Concretely, the sample was immersed into 3 weight percent NaCl aqueous solution (pH 5). A silver-silver chloride electrode was used as a reference electrode and a platinum wire electrode was used as a counter electrode. The above described mercury-xenon lamp was used to measure the change of potential under the irradiation. The relationship of the charge and reflectance was shown in FIG. 10. It was confirmed that the charge was substantially proportional with the color change.

(Experiment D: Potential Change of TiO2—WO3 Under and After the Irradiation of Ultraviolet Light in NaCl Aqueous Solution: Evaluation as a Photoreactive Device)

The samples according to examples 1 and 2 were immersed into 3 weight percent NaCl aqueous solution with a pH of 5. A silver-silver chloride electrode was used as a reference electrode and a platinum wire electrode was used as a counter electrode. The above mercury-xenon lamp was used to measure the potential change with or without ultraviolet light irradiated. The results were shown in FIG. 11. As can be seen from the results, electrons were transferred from the titanium dioxide at about minus 0.4 volt to WO3 to form its tungsten bronze structure. When terminating the irradiation of ultraviolet light, the tungsten bronze structure was naturally oxidized to reach equilibrium at about −0.2 volt.

(Experiment E: Reflectance Change of the Inventive Device Before and After Irradiating Ultraviolet Light in Gaseous Phase: Evaluation as a Photoreactive Device)

The device according to the example 2 (mix type) was used. Ultraviolet light was irradiated to the device in an atmosphere with a relative humidity of 100 percent using the above mercury-xenon lamp to measure the reflectance change induced by the irradiation. "handy-color-COLORIMETER" (supplied by "BYK-GARDNER" in the United States) was used for measuring the reflectance. The results were shown in FIG. 12. The reflectance of WO3 was changed when irradiating ultraviolet light to confirm the formation of tungsten bronze structure. Further in this experiment, it was confirmed that WO3 may be repeatedly colored and decolored in gaseous phase.

(Experiment F: Relationship of Intensity of Ultraviolet Light and reflectance in TiO2—WO3 in gaseous phase).

The device according to the example 2 (mix type) was used. Ultraviolet light was irradiated for five minutes as described in the "Experiment E" section to measure the reflectance. The color change just after the irradiation was measured and shown in FIG. 13. As can be seen from the figure, the larger the ultraviolet light, the larger the color change.

(Experiment G: Relationship of Moisture and Reflectance in TiO2—WO3 (in Gaseous Phase)

The device according to the example 2 (mix type) was used. Ultraviolet light was irradiated to the device as described in the "Experiment E" section to measure the reflectance. The ultraviolet light was irradiated for 20 minutes. The device was set in a atmosphere with a humidity of 0, 25, 50 or 100 percent. The results were shown in FIG. 14. When the humidity is low, the ionic conductivity of the membrane was also low, so that WO3 was not sufficiently reduced by electrons discharged from TiO2 to provide a relatively small color change. High humidity helps to provide a relatively large color change.

(Experiment H: The Color Change of the Device Before or After Surface Treatment with NaCl or Tungsten Silicate, or After Rinsing)

The color change of the sample according to the example 2 after the irradiation of ultraviolet light was measured as described in the "Experiment G" section. The relative moisture was adjusted to 0, 25, 50 or 100 percent. Data before the surface treatment were shown in the leftmost portions in FIGS. 15 and 16 for each humidity.

Each sample was subjected to surface treatment with NaCl or tungsten silicate and then subjected to the measurement of color change under the irradiation of ultraviolet light. The measured values were shown in the central portion of each figure for each humidity.

For the surface treatment with NaCl, 2 weight percent of NaCl dissolved in ethanol-water mixed solution (ethanol 70 percent) was prepared and cast on the sample at an amount of 10 $\mu$l/cm2 to form a film. The wet film was then dried at 100° C. for 30 minutes in an oven to provide white thin film of NaCl on the surface of the sample. For the surface treatment with tungsten silicate, 2 weight percent of tungsten silicate dissolved in ethanol-water mixed solution (ethanol 70 percent) was prepared and cast on the sample at an amount of 10 $\mu$l/cm2 to form wet film. The film was then dried at 100° C. for 30 minutes in an oven to provide white membrane of tungsten silicate on the surface of the sample.

Both of the above two samples were subjected to the measurement. Moreover, the two samples were rinsed and then subjected to the measurement.

As can be seen from FIGS. 15 and 16, the deviation of color change over the humidity change was considerably reduced in each of the samples after the surface treatment with NaCl or tungsten silicate. After the sample treated with NaCl was rinsed, the NaCl membrane was almost removed, so that the deviation of color change over the humidity was considerably increased, as shown in FIG. 15. On the contrary, the membrane treated with tungsten silicate was not removed after the rinse, so that the deviation of color change over humidity was also considerably reduced as shown in FIG. 16.

(Experiment I)

Fine particles of WO3 (with a diameter of 45 μm) and TEOS binder were coated onto a conductive glass with ITO by spin coating (1500 rpm) to form wet film, which was then fired at 200° C. for 30 minutes. The thus obtained WO3 electrode was used as a working electrode. A silver-silver chloride electrode was used as a reference electrode, and a platinum wire electrode was used as a counter electrode. The cyclic voltamograms (CV) were measured and shown in FIGS. 17 and 18. FIG. 17 shows the results of the measurement in 0.1 M of HCl aqueous solution at a pH of 1. FIG. 18 is the results of the measurement in 0.1 M of NaCl aqueous solution at a pH of 5. The measurements were carried out using a digital potentiostat "HZ-3000" (supplied by Hokuto Denko Corporation). In FIGS. 17 and 18, circles indicate light potentials (at a light intensity of 10 mW/cm2) of $TiO_2$ in the same solution.

As can be seen from the above results, WO3 was considered to be reduced to form tungsten bronze structure with light irradiated.

(Experiment J)

In the experiment I, each of constant voltages of +100 mV, 0 mV, –100 mV, –200 mV and –400 mV was applied and the distribution of reflectances over visible light in the range of 400 to 700 nm was measured. The results were shown in FIGS. 19 and 20. FIG. 19 shows the results of the measurement in 0.1 M of HCl aqueous solution at a pH of 1. FIG. 20 shows the results of the measurement in 0.1 M of NaCl aqueous solution at a pH of 5. Each constant voltage was applied by means of a potentiostat "HZ-3000" (supplied by Hokuto Denko Corporation). The reflectance was measured by using "handy-color-COLORIMETER" (supplied by "BYK-GARDNER corporation). At each pH, the color tone of WO3 was considerably changed by applying a negative constant voltage.

(Experiment K)

300 ml of ethanol solution dissolving 0.05 M of bis-2,4-pentanedionato titanium oxide (acetylacetone titanium oxide) was subjected to spray pyrolysis at 300° C. on the surface of a substrate to provide a film. The substrate was made of SUS 304 plate buffed with 0.05 μm alumina particles.

It was also prepared a dispersion containing silica binder ([NDC-100A] available from Nippon Soda corporation) and fine particles (with diameter of 500 nm) of WO3 dispersed in an amount of 0.116 g/ml. The dispersion was applied on the surface of a conductive glass (ITO) to form a film, which was then fired at 200° C. for 30 minutes. The thus obtained WO3 electrode was then wired with the substrate of SUS 304.

The thus obtained WO3 electrode and titanium oxide electrode were immersed into 0.1 M of NaCl aqueous solution (pH 5). The WO3 electrode was used as working electrode. A silver-silver chloride electrode was used as a reference electrode. A platinum wire electrode was used as a counter electrode. The change of reflectance of WO3 was measured with and without light irradiated by means of "LA-200UV" (supplied by Hayashi watch works co. Ltd.). The wavelength of light was 360 nm and the light intensity was 10 mW/cm2. The reflectance was measured using "handy-color-COLORIMETER" (supplied by "BYK-GARDNER corporation). The results were shown in FIG. 21.

Further, the reflectance change of WO3 electrode when applying a constant voltage of –370 mV was also shown for comparison in FIG. 21. The constant voltage was applied using a digital potentiostat "HZ-3000" (supplied by Hokuto Denko Corporation). As can be seen from the results, the reflectance of WO3 electrode was considerably changed by connecting the titanium dioxide electrode with WO3 electrode and by irradiating light. Such results were substantially same as the example of applying the constant negative voltage on WO3 electrode.

(Experiment L)

The device same as that in the experiment K was prepared. Ultraviolet light was irradiated to the device for 60 minutes as described above and the irradiation was terminated. The change of the potential of the titanium dioxide electrode over time was measured and shown in FIG. 22. As seen from the results, the potential of the titanium dioxide electrode was increased just after terminating the irradiation. However the potential was maintained not higher than –0.2 volt from about 60 minutes to about 300 minutes. The corrosive potential of SUS is about –0.15 volt. It is therefore understood that the corrosion of SUS may be prevented for a long time by employing the inventive device.

(Experiment M)

The main face of a substrate made SUS 304 was buffed with 0.05 μm alumina particles and divided into two halves with the equal area. 300 ml of ethanol solution dissolving 0.05 M of bis-2,4-pentanedionato titanium oxide (acetylacetone titanium oxide) was subjected to spray pyrolysis on the first half of the main face, at 300° C. to form a film.

It was also prepared dispersion containing fine particles of WO3 (with a diameter of 500 nm) dispersed in silica binder ([NDC-100A] supplied by Nippon Soda corporation) in an amount of 0.116 g/ml. The dispersion was coated onto the second half of the main face by spin coating to form a film, which was then fired at 200° C. for 30 minutes.

The substrate was then immersed into 3 weight percent NaCl aqueous solution (pH 5). A silver-silver chloride electrode was used as a reference electrode and a platinum electrode was used as a counter electrode. Ultraviolet light with a wavelength of 360 nm and a light intensity of 10 mW/cm2 (mercury-xenon lamp) was irradiated for 60 minutes and the irradiation was terminated. The potential change of the surface of the substrate was shown in FIG. 23. As a result, even after terminating the irradiation, the potential of the substrate surface was maintained under –0.15 volt for a long time.

FIG. 24 shows the potential change of the substrate surface covered only with titanium dioxide (without WO3) for the comparison. In this case where the substrate surface was covered with titanium dioxide, the potential of the electrode was increased to about –0.05 volt just after terminating the irradiation of ultraviolet light (just after 60 minutes). Therefore, such SUS steel covered with titanium dioxide alone was actually not protected from the corrosion in the dark.

(Experiment N)

Strontium titanate was used as a semiconductor for discharging electrons under light instead of titanium oxide, in this experiment.

Methanol solution (150 ml) of 0.02 M of bis-2,4-pentanedionatostrontium and Ethanol solution (150 ml) of 0.02 M of bis-2,4-pentanedionatotitanium oxide were mixed to obtain 300 ml of mixed solution. The solution was then subjected to spray pyrolysis at 300° C. on the surface of a conductive glass (ITO). The resultant film and substrate were then subjected to annealing at selected temperatures from 300 to 600° C. in an electrical furnace to provide electrodes.

The electrode was immersed into 3 weight percent of NaCl aqueous solution (pH 5) as a working electrode. A silver-silver chloride electrode was used as a reference electrode and a platinum electrode was used as a counter electrode. Ultraviolet light with a wavelength of 360 nm and light intensity of 10 mW/cm2 was irradiated for 60 minutes using a mercury-xenon lamp to measure light potential. The relationship of the annealing temperature and light potential was shown in FIG. 25.

As seen from the results, the light potential was considerably reduced by selecting an annealing temperature not higher than 500° C. The annealing temperature may preferably be not higher than 400° C. The obtained light potentials were considerably low, so that a metal material with a lower corrosive potential such as carbon steel may be protected from the corrosion by employing the invention.

In one embodiment of the invention, a metal material is a constructed structure which may be irradiated by sunlight, such as a gas tank, guard rail and street lamp.

(Experiment O: Confirmation of Products Produced by the Reaction of Electrons Discharged Under Natural Oxidation of HxWO3: Confirmation of Reduction of Oxygen Molecules)

It was prepared dispersion of WO3 fine particles (with a diameter of 500 nm) in an amount of 0.116 g/ml dispersed in silica binder "NDC-100A" (Nippon Soda Corporation. The dispersion was coated on a conductive glass (ITO) to form a film, which was then fired at 200° C. for 30 minutes. The thus obtained WO3 electrode was used as a working electrode. A silver-silver chloride electrode was used as a reference electrode and a platinum wire electrode was used as a counter electrode. The WO3 electrode was immersed in 3 weight percent NaCl aqueous solution at pH 5 and electrochemically reduced by applying a constant voltage of −400 mV for 60 minutes. After terminating the electrochemical reduction, the potential change over time was measured by means of a digital potentiostat "HZ-3000" (supplied by Hokuto Denko corporation). The atmosphere was replaced by argon (deaerated by argon) or subjected to open air (without replacing by argon). FIG. 26 shows the results of both cases.

When the atmosphere was not replaced by argon, the potential was rapidly increased just after terminating the electrochemical reduction. When the atmosphere was replaced by argon, the potential was maintained under −0.2 V for a long time, meaning that the discharge of electrons into atmosphere was prevented. Therefore, it is considered that the electrons discharged from WO3 were utilized to reduce oxygen molecules in atmosphere, and that the discharge of electrons was prevented when substantially no oxygen molecules present in the atmosphere.

(Experiment P: Experiment for Evaluating an Activity for Inhibiting the Growth of Microorganisms)

It was prepared dispersion of WO3 fine particles (with a diameter of 500 nm) in an amount of 0.116 g/ml dispersed in silica binder "NDC-100A" (Nippon Soda Corporation). The dispersion was coated on a pyrex glass substrate to form a film, which was then fired at 200° C. for 30 minutes. The thus obtained WO3 electrode was used as a working electrode. A silver-silver chloride electrode was used as a reference electrode and a platinum wire electrode was used as a counter electrode. The WO3 electrode was immersed in 3 weight percent NaCl aqueous solution at pH 5 and electrochemically reduced by applying a constant voltage of −400 mV for 60 minutes. The atmosphere was replaced by argon. As comparative examples, a WO3 sample without the above electrochemical reduction and a sample of a pyrex glass were prepared.

50 microliter of liquid containing *Escherichia coli* bacteria (bacteria number 200) was cast on each sample and set for 6 hours in an atmosphere with a humidity of 100 percent. The resultant liquid was recovered, poured onto a deoxycholate agar medium and cultivated at 37° C. for 24 hours. The activity of preventing the growth of the bacteria was evaluated by counting the number of colonies. The results were shown in FIG. 27. It was confirmed that WO3 film electrochemically reduced at a constant voltage has an activity for preventing the growth of *Escherichia coli* in the dark. Such prevention or inhibition of the growth of bacteria through the above mechanism has not been proven.

As described above, according to the fourth embodiment of the invention relating to the device and method for controlling the growth of microorganisms, an electrochromic film may be electrochemically reduced at a constant voltage and subjected to natural oxidation in the dark to prevent the growth of microorganisms.

The microorganisms as a target of the fourth embodiment of the invention includes all the microorganisms known to be inhibited, at least to some degree, by hydrogen peroxide and all the microorganisms known to be inhibited, at least to some degree, by superoxides.

(Experiment Q: Potential Change of Device for Reducing Oxygen Molecules Under the Irradiation of Ultraviolet Light and After Terminating the Irradiation)

Samples according to the examples 1 and 2 were prepared. Each sample was immersed into 3 weight percent NaCl aqueous solution at pH 5. A silver-silver chloride electrode was used as a reference electrode and a platinum wire electrode was used as a counter electrode. Ultraviolet light was irradiated to each of the samples using a mercury-xenon lamp ([LA-200UV] supplied by Hayashi watch works co. Ltd.: with a wavelength of 360 nm and a light intensity of 10 mW/cm2). The potential change of each device with or without the irradiation was measured. The results were shown in FIG. 28. As seen from the results, tungsten dioxide discharges electrons, which are transferred to WO3 to form tungsten bronze structure at about −0.4 V. When terminating the irradiation of ultraviolet light, the potential is maintained at about −0.2 V to form plateau. In this plateau, electrons and protons are transferred from the tungsten bronze structure to oxygen molecules in the atmosphere to produce hydrogen peroxide and superoxides.

(Experiment R: Reflectance Change of a Device for Reducing Oxygen Molecules in Gaseous Phase)

The sample according to the example 2 (mix type) was used. Ultraviolet light was irradiated to the sample using a mercury-xenon lamp ([LA-200UV] supplied by Hayashi watch works co. Ltd.: with a wavelength of 360 nm and a light intensity of 10 mW/cm2) in atmosphere of a humidity of 100 percent to measure the reflectance change of WO3. The reflectance was measured by [handy-color-COLORIMETER] (available from BYK-GARDNER in the United States). The results were shown in FIG. 29. As a result, WO3 exhibited considerable change in the reflectance when irradiating ultraviolet light, confirming that its crystalline structure is converted to tungsten bronze structure.

(Experiment S: Reflectance Change Over Time of a Device for Reducing Oxygen Molecules without Ultraviolet Light in Gaseous Phase)

The above ultraviolet light was irradiated onto the sample according to the example 2 (mix type) for 120 minutes, as described above, and the irradiation was stopped for 680 minutes. The reflectance change over time was shown in FIG. 30. As seen from the results, tungsten bronze structure was formed under ultraviolet light. After terminating the irradiation of ultraviolet light, the tungsten bronze structure was gradually converted to the original WO3 structure. During the phase conversion process, the tungsten bronze structure discharges electrons and protons into atmosphere, which then reduce oxygen molecules present in the atmosphere.

(Experiment T: Experiment for Evaluating the Inhibition Activity of the Growth of Microorganisms Using the Sample According to the Example 2)

The sample according to the example 2 (reduced with light) was used to evaluate the inhibition activity of *Escherichia coli*. Ultraviolet light was irradiated to the sample for 60 minutes in an atmosphere (80 percent N2; 20 percent O2; humidity 50 percent) to reduce WO3 to provide a sample according to the invention. The sample according to the example 2 (not reduced with ultraviolet light) and a pyrex glass substrate were prepared as two comparative examples.

50 microliter of liquid containing *Escherichia coli* bacteria (bacteria number 200) was cast on each sample and set for 6 hours in an atmosphere with a humidity of 100 percent. The resultant liquid was recovered, poured onto a deoxycholate agar medium and cultivated at 37° C. for 24 hours. The activity of preventing the growth of the bacteria was evaluated by counting the number of colonies. The results were shown in FIG. 31. As seen from the results, the sample reduced with light (TiO2—HxWO3) exhibited the inhibition activity of the growth of microorganisms.

What is claimed is:

1. A photoreactive device comprising:
    a semiconductor having a conduction band with a potential and being capable of producing electrons under the irradiation of light on said semiconductor; and
    an oxidation-reduction material having a redox potential being positive compared with said potential of said conduction band,
    wherein said electrons produced by said semiconductor are supplied into said oxidation-reduction material under the irradiation of light so that said oxidation-reduction material is reduced with the crystalline structure of said material converted for storing said electrons in said material, and
    wherein said oxidation-reduction material is reduced in the presence of a cation.

2. The device of claim 1, wherein said oxidation-reduction material is an electrochromic material.

3. The device of claim 1, wherein said oxidation-reduction material is an oxide semiconductor which may be reduced to convert the crystalline structure of said oxide semiconductor to tungsten bronze structure.

4. The device of claim 1, comprising a substrate, a layer for storing electrons made of said oxidation-reduction material on said substrate, and a semiconductor layer made of said semiconductor on said substrate.

5. The device of claim 1, comprising a substrate, a layer for storing electrons made of said oxidation-reduction material on said substrate, and a porous semiconductor layer made of said semiconductor on said layer for storing electrons.

6. The device of claim 1, comprising a formed body made from powder of said oxidation-reduction material and powder of said semiconductor.

7. The device of claim 1, comprising a conductor of a cation.

8. The device of claim 7, wherein said conductor is substantially insoluble in water.

9. The device of claim 1 for use in gaseous phase.

10. The device of claim 1, wherein the reflectance to visible light of said oxidation-reduction material may be changed when light is irradiated on said device.

11. The device of claim 1 for detecting light intensity of light irradiated on said device based on the change of a property of said oxidation-reduction material.

12. The device of claim 1 for detecting a humidity based on the change of a property of said oxidation-reduction material depending on said humidity.

13. A translucent member comprising a main body made of a translucent material and said photoreactive device according to claim 1 fixed to said main body.

14. The member of claim 13, wherein said member is a window.

15. An ornament comprising said photoreactive device according to claim 1.

* * * * *